(12) United States Patent
Reed et al.

(10) Patent No.: US 7,911,362 B2
(45) Date of Patent: Mar. 22, 2011

(54) MAP INTERFACE WITH REMOVABLE PATH LOCATIONS

(75) Inventors: William E. Reed, Jacksonville, FL (US); Ryan Massie, San Francisco, CA (US); Anton V. Jouline, Sherman Oaks, CA (US); Michiel Frishert, Berkeley, CA (US); Gary Chevsky, Alamo, CA (US)

(73) Assignee: IAC Search & Media, Inc., Oakland, CA (US)

( * ) Notice: Subject to any disclaimer, the term of this patent is extended or adjusted under 35 U.S.C. 154(b) by 56 days.

(21) Appl. No.: 12/505,354

(22) Filed: Jul. 17, 2009

(65) Prior Publication Data

US 2009/0289815 A1   Nov. 26, 2009

Related U.S. Application Data

(63) Continuation of application No. 11/677,944, filed on Feb. 22, 2007, now Pat. No. 7,639,162.

(51) Int. Cl.
 *G08G 1/123* (2006.01)
(52) U.S. Cl. .............. 340/995.19; 340/995.14
(58) Field of Classification Search ............ 340/995.1, 340/995.14, 995.18, 995.19, 995.2, 995.22, 340/995.24, 990; 701/201, 207, 209; 342/357.09; 345/428, 502
See application file for complete search history.

(56) References Cited

U.S. PATENT DOCUMENTS

| | | | |
|---|---|---|---|
| 5,638,280 A | 6/1997 | Nishimura et al. | |
| 6,026,409 A | 2/2000 | Blumenthal | |
| 6,201,544 B1 | 3/2001 | Ezaki | |
| 6,374,182 B2 | 4/2002 | Bechtolsheim et al. | |
| 6,680,694 B1 | 1/2004 | Knockeart et al. | |
| 6,906,643 B2 | 6/2005 | Samadani et al. | |
| 7,088,365 B2 | 8/2006 | Hashizume | |
| 7,158,878 B2 | 1/2007 | Rasmussen et al. | |
| 7,373,244 B2 | 5/2008 | Kreft | |
| 7,499,949 B2 | 3/2009 | Barton | |
| 2005/0270311 A1 | 12/2005 | Rasmussen et al. | |
| 2007/0040895 A1 | 2/2007 | Barbeau et al. | |
| 2007/0096945 A1 | 5/2007 | Rasmussen et al. | |
| 2007/0176796 A1 | 8/2007 | Bliss et al. | |
| 2007/0182751 A1 | 8/2007 | Rasmussen et al. | |
| 2008/0172374 A1 | 7/2008 | Wolosin et al. | |
| 2008/0291205 A1 | 11/2008 | Rasmussen et al. | |

OTHER PUBLICATIONS

ESA, "Esa's Google Maps API Examples," Jun. 2, 2006, URL: http://web.archive.org/web/20060602012414/http://koti.mbnet.fi/ojalesa/exam/draggable.html. Ask Jeeves, Inc., The New Ask.com Unveiled: New Site, New Brand, New Tools, Innovative Search Tools, Advanced Search Technology and Sleek Design Help Users Search Faster, PR Newswire—News & Information (http://sev.prnewswire.com/computerelectronics/20060227/SFM06827022006-1.html), Feb. 27, 2006, Oakland, California.

*Primary Examiner* — Van T. Trieu
(74) *Attorney, Agent, or Firm* — Stephen M. De Klerk; SNR Denton US LLP

(57) ABSTRACT

A map user interface is described, including a first view transmitted from a server computer system to the client computer system, the first view including a first map and the initial path displayed on the first map, the initial path being from a starting location via at least one intermediate location to an end location, a deletion selector, selection of the deletion selector causing transmission of a deletion command being indicative of removal of a selected one of the locations, and a second view generated in response to the transmission of the deletion command, the second view including a second map and the modified path displayed on the second map, the modified path including all of the locations but not including the selected location.

62 Claims, 37 Drawing Sheets

MAP INTERFACE WITH REMOVABLE PATH LOCATIONS

CROSS-REFERENCE TO RELATED APPLICATIONS

This is a continuation of prior U.S. patent application Ser. No. 11/677,944, filed on Feb. 22, 2007, now U.S. Pat. No. 7,639,162 all of which is incorporated herein by reference in its entirety.

BACKGROUND OF THE INVENTION

1. Field of the Invention

This invention relates generally to a user interface that is transmitted from a server computer system to a client computer system and to a method of interfacing with a client computer system, and more specifically to mapping technologies and technologies for finding directions.

2. Discussion of the Related Art

The internet has become a useful tool for finding locations and directions on maps. Various map interfaces may offer one or more of the following features:

(i) Address Book: Registered users can store a list of commonly used street addresses, making it unnecessary to type them in again. A recently entered address can be quickly recalled by selecting one from a drop-down list.

(ii) Live Traffic: Traffic incidents and current highway conditions can be viewed on the map.

(iii) Point of Interest Finder: Can be used to find businesses and other points of interest near the current location, with clickable icons that supply an address, a telephone number, and links for more information.

(iv) Driving Directions: Driving directions can be displayed in printable form.

Prior art map interfaces are usually relatively static and do not allow for much, if any, user interaction.

SUMMARY OF THE INVENTION

The invention provides a user interface, including a first view transmitted from a server computer system to the client computer system, the first view including a first map and the initial path displayed on the first map, the initial path being from a starting location via at least one intermediate location to an end location, a deletion selector, selection of the deletion selector causing transmission of a deletion command being indicative of removal of a selected one of the locations, and a second view generated in response to the transmission of the deletion command, the second view including a second map and the modified path displayed on the second map, the modified path including all of the locations but not including the selected location.

In the user interface, the second map may be the same as the first map.

In the user interface, the selected location may be the starting location.

In the user interface, the selected location may be the end location.

In the user interface, the selected location may be the intermediate location.

In the user interface, the first view includes a plurality of location deletion markers, each in proximity to a respective address for a respective one of the locations, the deletion command being transmitted upon selection of one of the location deletion markers.

In the user interface, the first view includes the initial driving directions to follow the initial path and the second view includes the modified driving directions to follow the modified path.

In the user interface, the initial driving directions include a starting set of directions located between an address for the first location and an address for the intermediate location, and an ending set of directions located between the address for the intermediate location and an address for the end location.

In the user interface, the first view includes a location marker at an initial one of the locations, the location marker being movable from the initial location to a target location on the map.

In the user interface, the initial path may be adjustable.

In the user interface, the initial path may be adjustable by moving the starting location on the map.

In the user interface, the initial path may be adjustable by moving the end location on the map.

In the user interface, the initial path may be adjustable by moving the intermediate location on the map.

In the user interface, the first view includes an initial path displayed on the first map, the initial path being from a starting location via at least one intermediate location to an end location, at least one of the locations being the selected location, a deletion selector, selection of the deletion selector causing transmission of a deletion command being indicative of removal of a selected one of the locations, and a second view generated in response to the transmission of the deletion command, the second view including a second map and the modified path displayed on the second map, the modified path including all of the locations but not passing through the selected location.

In the user interface, a second path representing a second mode of transportation from a starting location and an end location displayed on the said at least one map, the second path being at least partially different from the first path, and displaying the second path on the map.

The user interface may further include an aerial selector, selection of the aerial selector adding an aerial photograph with the map over the aerial photograph.

In the user interface, the map may be a street map.

The invention further provides a method of interfacing with a client computer system, including calculating an initial path from a starting location via at least one intermediate location to an end location, transmitting a first view from a server computer system to the client computer system, the first view including a first map and the initial path displayed on the first map, receiving a deletion command from the client computer system at the server computer system, the deletion command being indicative of removal of a selected one of the locations, and transmitting a second view from a server computer system to the client computer system, the second view including a second map and a first modified path displayed on the second map, the first modified path not including the selected location.

In the method, the second map may be the same as the first map.

In the method, the selected location may be the starting location.

In the method, the selected location may be the end location.

In the method, the selected location may be the intermediate location.

In the method, the first view includes a plurality of location deletion markers, each in proximity to a respective address for a respective one of the locations, the deletion command being transmitted upon selection of one of the location deletion markers.

The method may further include determining initial driving directions to follow the initial path, wherein the first view includes the initial driving directions, and determining modified driving directions to follow the modified path, wherein the second view includes the modified driving directions.

In the method, the initial driving directions include a starting set of directions located between an address for the starting location and an address for the intermediate location, and an ending set of directions located between the address for the intermediate location and an address for the end location.

In the method, the first view includes a location marker at an initial one of the locations, the location marker being movable from the initial location to a target location on the map.

The method may further include adjusting the initial path on the map.

In the method, the initial path may be adjustable by moving the starting location on the map.

In the method, the initial path may be adjustable by moving the end location on the map.

In the method, the initial path may be adjustable by moving the intermediate location on the map.

The method may further include receiving a reordering command from the client computer system at the server computer system, and in response to the reordering command, calculating a modified path that includes all of the locations but following a sequence other than from a starting location via the intermediate location to the selected location.

The method may further include transmitting a first view from a server computer system to the client computer system, the first view including a first map and the first path displayed on the map, calculating a second path representing a second mode of transportation from the starting location to the end location, the second path being at least partially different from the first path, and displaying the second path on the map.

The method may further include receiving an aerial view command from the client computer system at the server computer system, and in response to the aerial view command, displaying an aerial photograph below the map.

In the method, the map may be a street map.

A computer-readable medium having stored thereon a set of instructions which, when executed by a processor of a computer, performs the method including calculating an initial path from a starting location via at least one intermediate location to an end location, transmitting a first view from a server computer system to the client computer system, the first view including a first map and the initial path displayed on the first map, receiving a deletion command from the client computer system at the server computer system, the deletion command being indicative of removal of a selected one of the locations, and transmitting a second view from a server computer system to the client computer system, the second view including a second map and the modified path displayed on the second map, the modified path not including the selected location.

In the instructions, the second map may be the same as the first map.

In the instructions, the selected location may be the starting location.

In the instructions, the selected location may be the end location.

In the instructions, the selected location may be the intermediate location.

In the instructions, the first view includes a plurality of location deletion markers, each in proximity to a respective address for a respective one of the locations, the deletion command being transmitted upon selection of one of the location deletion markers.

The method executed by the instructions may further include determining initial driving directions to follow the initial path, wherein the first view includes the initial driving directions, and determining modified driving directions to follow the modified path, wherein the second view includes the modified driving directions.

In the instructions, the initial driving directions include a starting set of directions located between an address for the starting location and an address for the intermediate location, and an ending set of directions located between the address for the intermediate location and an address for the end location.

In the instructions, the first view includes a location marker at an initial one of the locations, the location marker being movable from the initial location to a target location on the map.

The method executed by the instructions may further include adjusting the initial path on the map.

In the instructions, the initial path may be adjustable by moving the starting location on the map.

In the instructions, the initial path may be adjustable by moving the end location on the map.

In the instructions, the initial path may be adjustable by moving the intermediate location on the map.

In the instructions, the method further includes receiving a reordering command from the client computer system at the server computer system, and in response to the reordering command, calculating a modified path that includes all of the locations but following a sequence other than from a starting location via the intermediate location to the selected location.

In the instructions, the modified path represents a first mode of transportation from a starting location to an end locations, further including calculating a second modified path representing a second mode of transportation from the starting location to the end location, the second path being at least partially different from the first path, and displaying the second modified path on the map.

The method executed by the instructions may further include receiving an aerial view command from the client computer system at the server computer system, and in response to the aerial view command, displaying an aerial photograph below the map.

In the instructions, the map may be a street map.

BRIEF DESCRIPTION OF THE DRAWINGS

The invention is further described by way of example with reference to the accompanying drawings wherein.

DETAILED DESCRIPTION OF THE INVENTION

Figure 1:
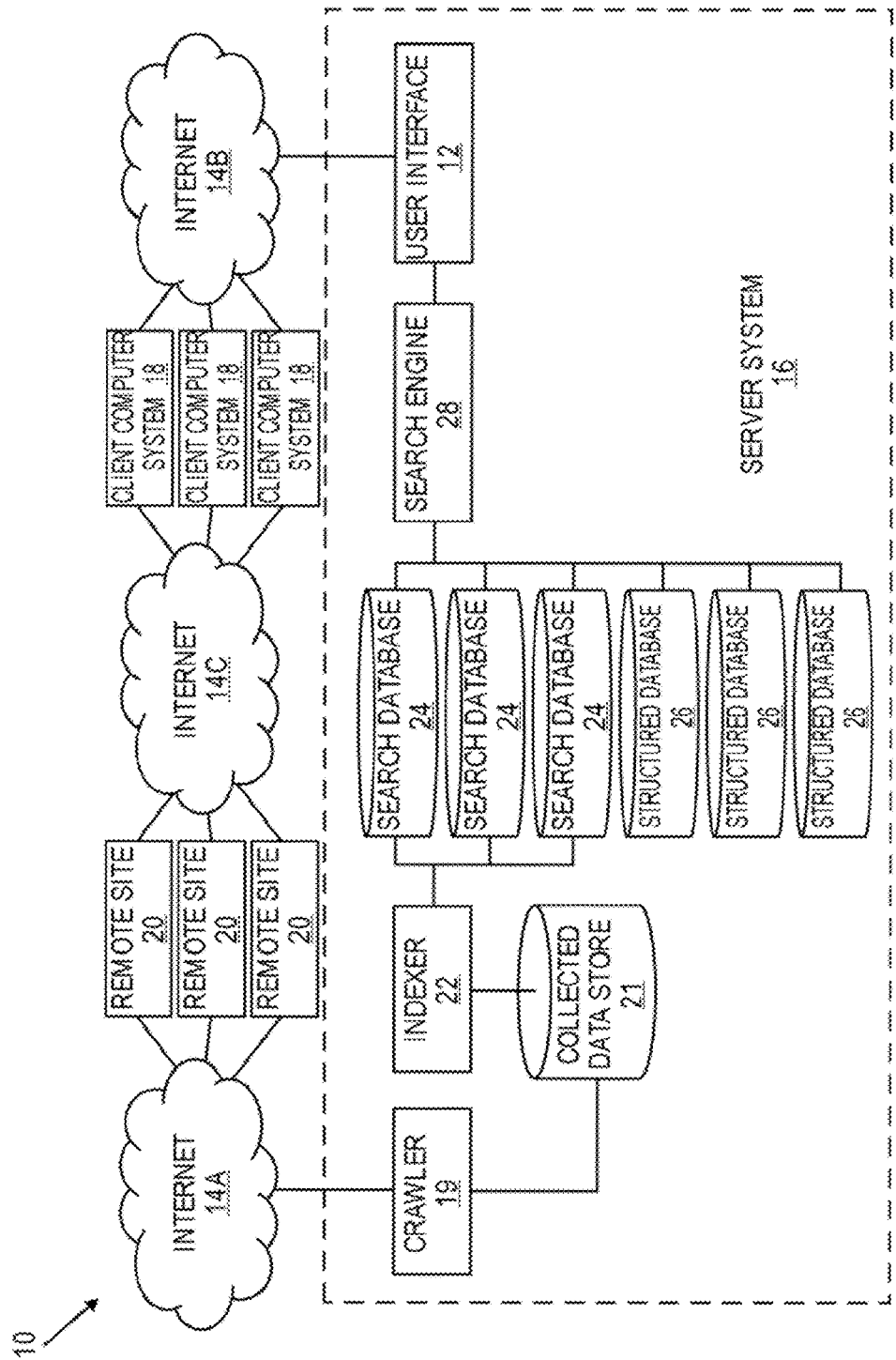
FIG. 1 is a block diagram of a network environment in which a user interface according to an embodiment of the invention may find application.

FIG. 1 of the accompanying drawings illustrates a network environment 10 that includes a user interface 12, according to an embodiment of the invention, including the internet 14A, 14B and 14C, a server computer system 16, a plurality of client computer systems 18, and a plurality of remote sites 20.

The server computer system 16 has stored thereon a crawler 19, a collected data store 21, an indexer 22, a plurality of search databases 24, a plurality of structured databases 26, a search engine 28, and the user interface 12. The novelty of the present invention revolves around the user interface 12, the search engine 28 and one or more of the structured databases 26. The crawler 19 is connected over the internet 14A to the remote sites 20. The collected data store 21 is connected to the crawler 19, and the indexer 22 is connected to the collected data store 21. The search databases 24 are connected to the indexer 22. The search engine 28 is connected to the search databases 24 and the structured databases 26. The client computer systems 18 are located at respective client sites and are connected over the internet 14B and the user interface 12 to the search engine 28.

Figure 2:
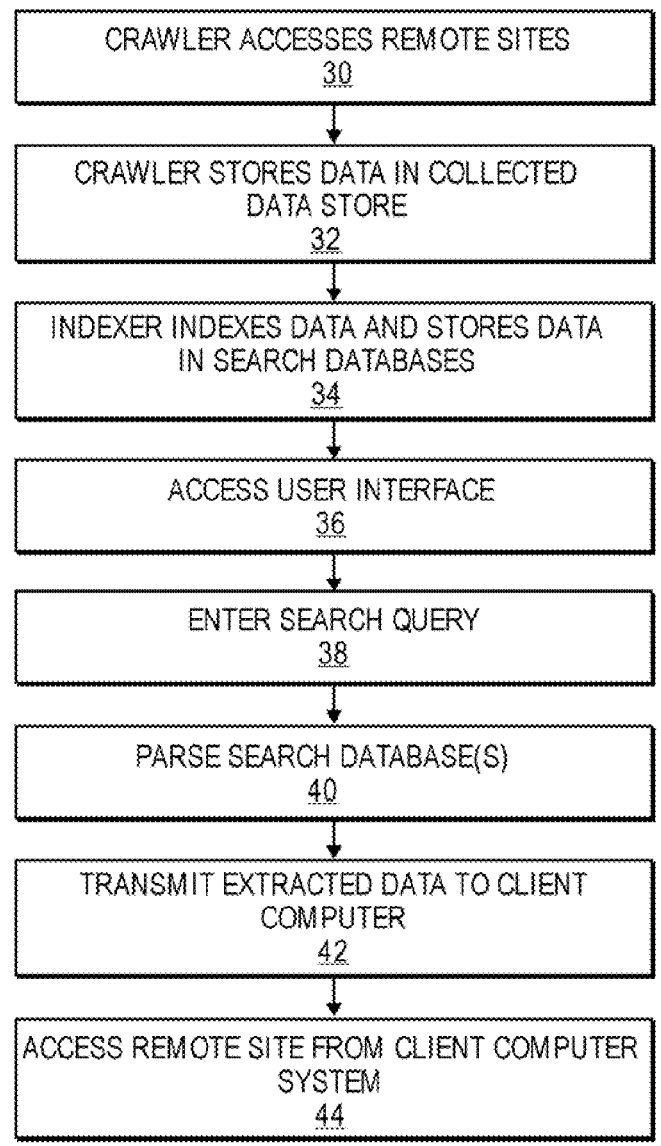
FIG. 2 is a flowchart illustrating how the network environment is used to search and find information.

Reference is now made to FIGS. 1 and 2 in combination to describe the functioning of the network environment 10. The crawler 19 periodically accesses the remote sites 20 over the internet 14A (step 30). The crawler 19 collects data from the remote sites 20 and stores the data in the collected data store 21 (step 32). The indexer 22 indexes the data in the collected data store 21 and stores the indexed data in the search databases 24 (step 34). The search databases 24 may, for example, be a "Web" database, a "News" database, a "Blogs & Feeds" database, an "Images" database, etc. The structured databases 26 are licensed from third party providers and may, for example, include an encyclopedia, a dictionary, maps, a movies database, etc.

A user at one of the client computer systems 18 accesses the user interface 12 over the internet 14B (step 36). The user can enter a search query in a search box in the user interface 12, and either hit "Enter" on a keyboard or select a "Search" button or a "Go" button of the user interface 12 (step 38). The search engine 28 then uses the "Search" query to parse the search databases 24 or the structured databases 26. In the example of where a "Web" search is conducted, the search engine 28 parses the search database 24 having general Internet Web data (step 40). Various technologies exist for comparing or using a search query to extract data from databases, as will be understood by a person skilled in the art.

The search engine 28 then transmits the extracted data over the internet 14B to the client computer system 18 (step 42). The extracted data typically includes URL links to one or more of the remote sites 20. The user at the client computer system 18 can select one of the links to the remote sites 20 and access the respective remote site 20 over the internet 14C (step 44). The server computer system 16 has thus assisted the user at the respective client computer system 18 to find or select one of the remote sites 20 that have data pertaining to the query entered by the user.

Figure 3:
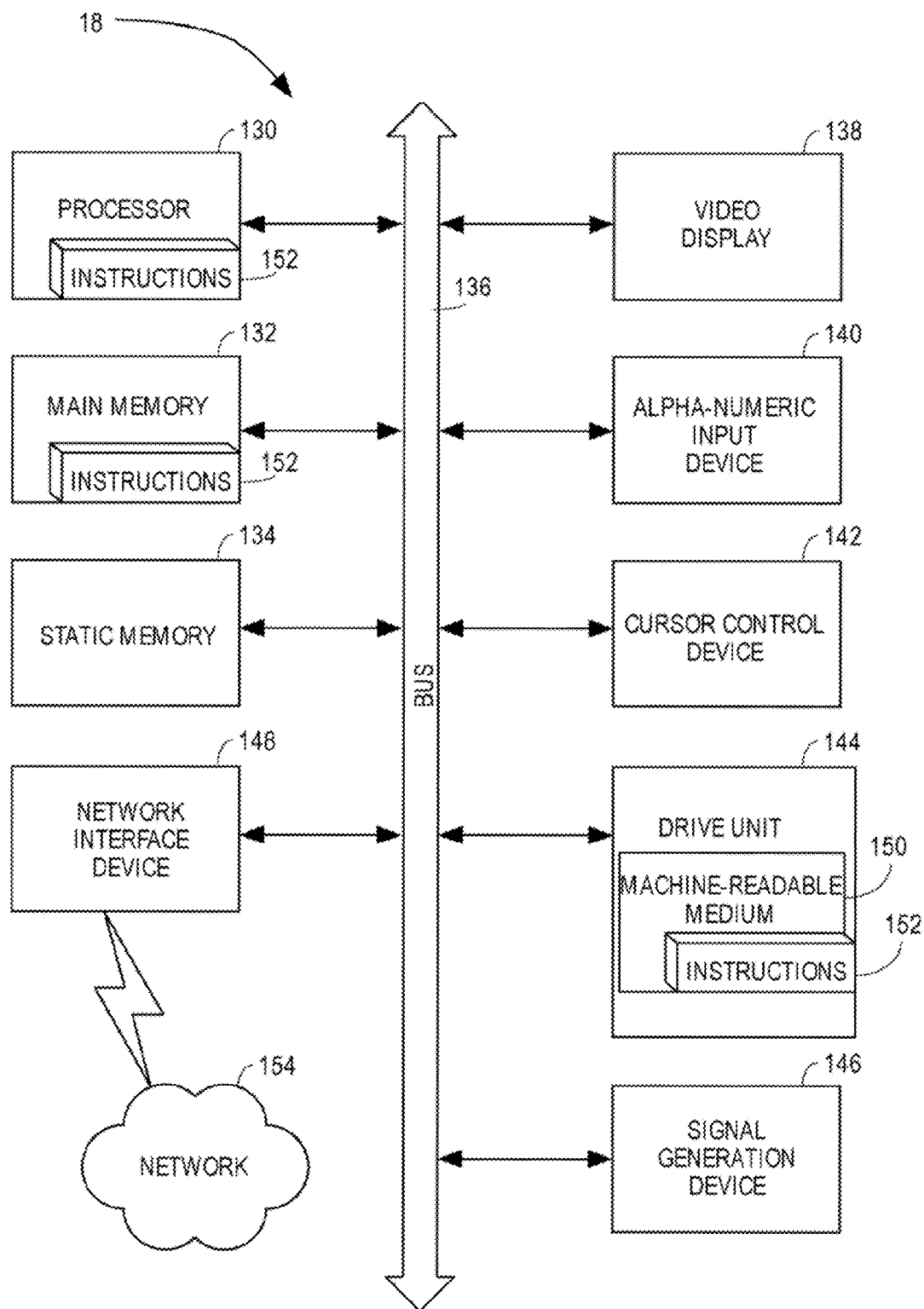
FIG. 3 is a block diagram of a client computer system forming area of the network environment, but may also be a block diagram of a computer in a server computer system forming area of the network environment.

FIG. 3 shows a diagrammatic representation of a machine in the exemplary form of one of the client computer systems 18 within which a set of instructions, for causing the machine to perform any one or more of the methodologies discussed herein, may be executed. In alternative embodiments, the machine operates as a standalone device or may be connected (e.g., network) to other machines. In a network deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term (machine) shall also be taken to include any collection of machines that individually or jointly execute a set (or multiple sets) of instructions to perform any one or more of the methodologies discussed herein. The server computer system 16 of FIG. 1 may also include one or more machines as shown in FIG. 3.

The exemplary client computer system 18 includes a processor 130 (e.g., a central processing unit (CPU), a graphics processing unit (GPU), or both), a main memory 132 (e.g., read-only memory (ROM), flash memory, dynamic random access memory (DRAM) such as synchronous DRAM (SDRAM) or Rambus DRAM (RDRAM), etc.), and a static memory 134 (e.g., flash memory, static random access memory (SRAM), etc.), which communicate with each other via a bus 136.

The client computer system 18 may further include a video display 138 (e.g., a liquid crystal display (LCD) or a cathode ray tube (CRT)). The client computer system 18 also includes an alpha-numeric input device 140 (e.g., a keyboard), a cursor control device 142 (e.g., a mouse), a disk drive unit 144, a signal generation device 146 (e.g., a speaker), and a network interface device 148.

The disk drive unit 144 includes a machine-readable medium 150 on which is stored one or more sets of instructions 152 (e.g., software) embodying any one or more of the methodologies or functions described herein. The software may also reside, completely or at least partially, within the main memory 132 and/or within the processor 130 during execution thereof by the client computer system 18, the memory 132 and the processor 130 also constituting machine readable media. The software may further be transmitted or received over a network 154 via the network interface device 148.

While the instructions 152 are shown in an exemplary embodiment to be on a single medium, the term "machine readable medium" should be taken to understand a single medium or multiple media (e.g., a centralized or distributed database and/or associated caches and servers) that store the one or more sets of instructions. The term "machine readable medium" shall also be taken to include any medium that is capable of storing, encoding, or carrying a set of instructions for execution by the machine and that caused the machine to perform any one or more of the methodologies of the present invention. The term "machine readable medium" shall accordingly be taken to include, but not be limited to, solid-state memories and optical and magnetic media.

Figure 4:
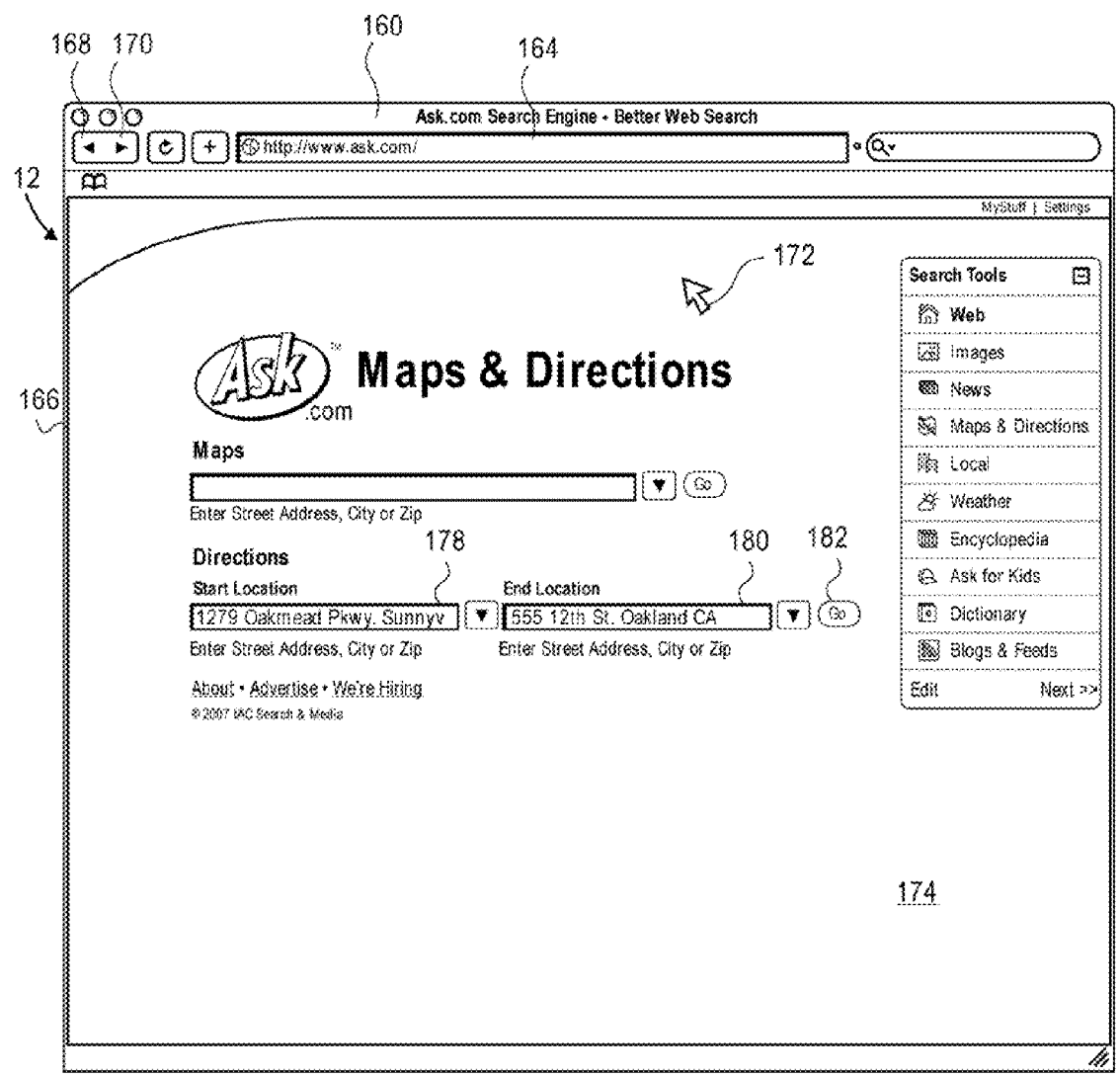
FIG. 4 is a "Maps & Direction" view of a user interface according to an embodiment of the invention.

FIG. 4 of the accompanying drawings illustrates a browser 160 that displays a user interface 12 according to an embodiment of the invention. The browser 160 may, for example, be an Internet Explorer™, Firefox™, Netscape™, or any other browser. The browser 160 has an address box 164, a viewing pane 166 and various buttons such as back and forward buttons 168 and 170. The browser 160 is loaded on a computer at the client computer system 18 of FIG. 1. A user at the client computer system 18 can load the browser 160 into memory, so that the browser 160 is displayed on a screen such as the video display 138 in FIG. 3. The user enters an address (in the present example, the internet address http://www.ask.com/) in the address box 164. A mouse (i.e. the cursor control device 142 of FIG. 3) is used to move a cursor 172 into the address box 164, and a left button is clicked on the mouse. After clicking on the left button of the mouse, the user can use a keyboard to enter text into the address box 164. The user then presses (Enter) on the keyboard. A command is then sent over the internet requesting a page corresponding to the address that is entered into the address box 164. The page is retrieved and transmitted to the client computer system 18 and displayed in the viewing pane 166.

FIG. 4 illustrates a "Maps & Directions" view 174 of the user interface 12. Further details of the "Maps & Directions" view 174 and how it is obtained are described in U.S. patent application Ser. No. 11/611,777 filed on Dec. 15, 2006, details of which are incorporated herein by reference.

The "Maps & Directions" view 174 includes a start location search box 178, an end location search box 180, and a "Go" button 182. The user enters an address for a start location (in the present example "1279 Oakmead Pkwy, Sunnyvale, Calif.") in the start location search box 178 and an address for an end location (in the present example "555 12th St. Oakland, Calif.") in the end location search box 180. The user enters text into either one of the search boxes 178 or 180 by moving the cursor 172 into a respective one of the search boxes 178 or 180, subsequently clicking the left button on the mouse, and then typing the text using the keyboard. The user subsequently selects the "Go" button 182 to conduct a search. The search is conducted by the search engine 28 of FIG. 1 in one of the structured databases 26 for "Maps & Directions". The search engine 28 subsequently returns data extracted from the respective structured database 26 over the internet 14B to the client computer system 18. The steps of entering a search query, at one of the client computer systems 18, parsing one of the search databases 24, and transmitting extracted data corresponding to steps 38, 40 and 42, respectively, in FIG. 2. Further details of how the search engine 28 searches the respective structured database 26 will be evident to a person of ordinary skill in the art following review of the details of this document.

Figure 5:
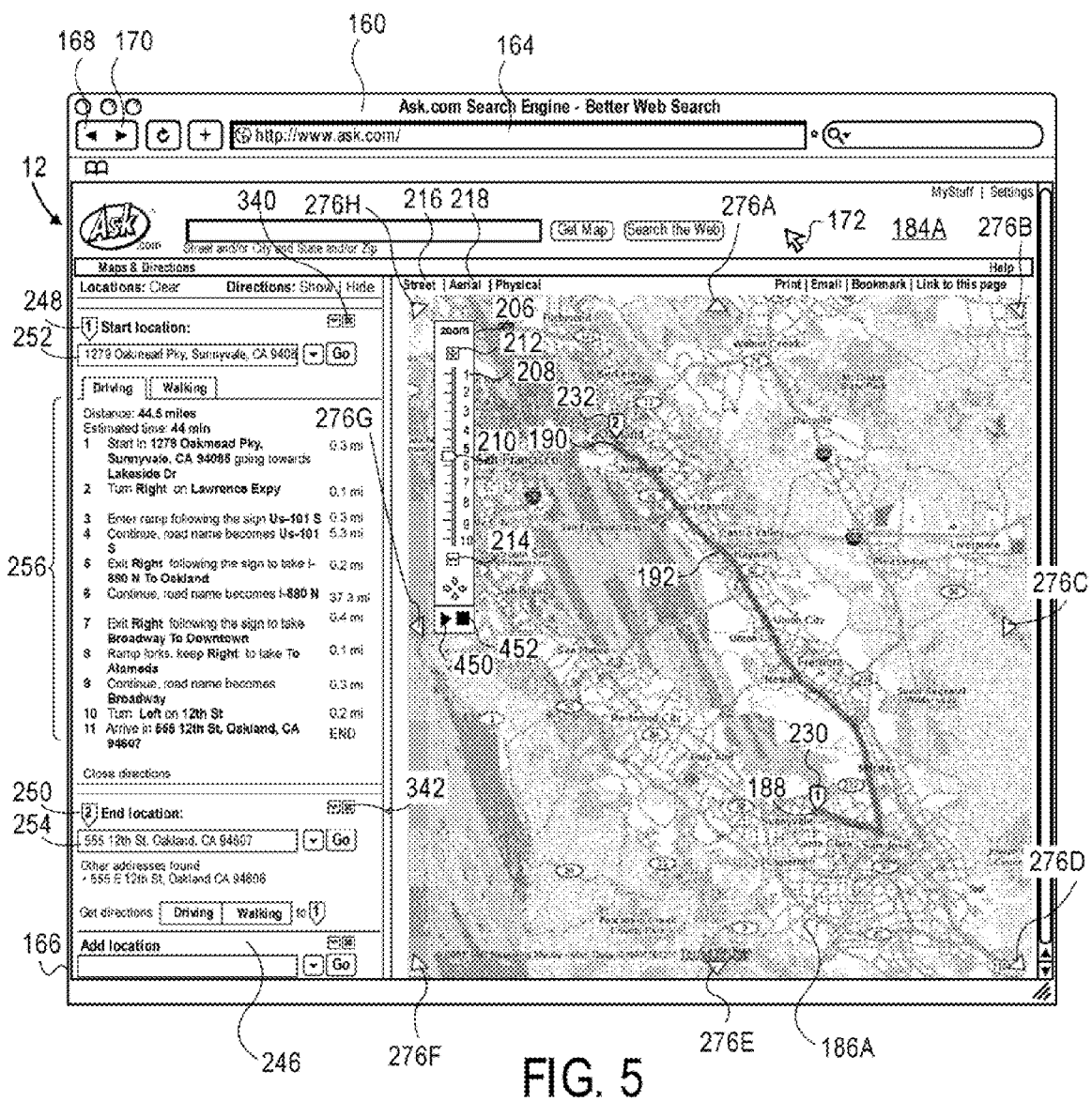
FIG. 5 is a first results view of the user interface.

FIG. 5 illustrates a view 184A of the user interface 12 that replaces the view 174 of FIG. 4 upon selection of the "Go" button 182. The view 184A includes a map 186A with start and end locations 188 and 190, respectively, located on the map 186A. The start location 188 is at a longitude and latitude corresponding to the address that is entered in the start location search box 178 in FIG. 4. Similarly, the end location 190 is at a longitude and latitude corresponding to the address entered in the end location search box 180. The map 186A is a street map. The search engine 28 of FIG. 1 has calculated a path 192 for driving from the start location 188 to the end location 190 and the path 192 is transmitted with and displayed on the map 186A. The path 192 follows a series of roads and streets from one intersection to the next.

Figure 6:
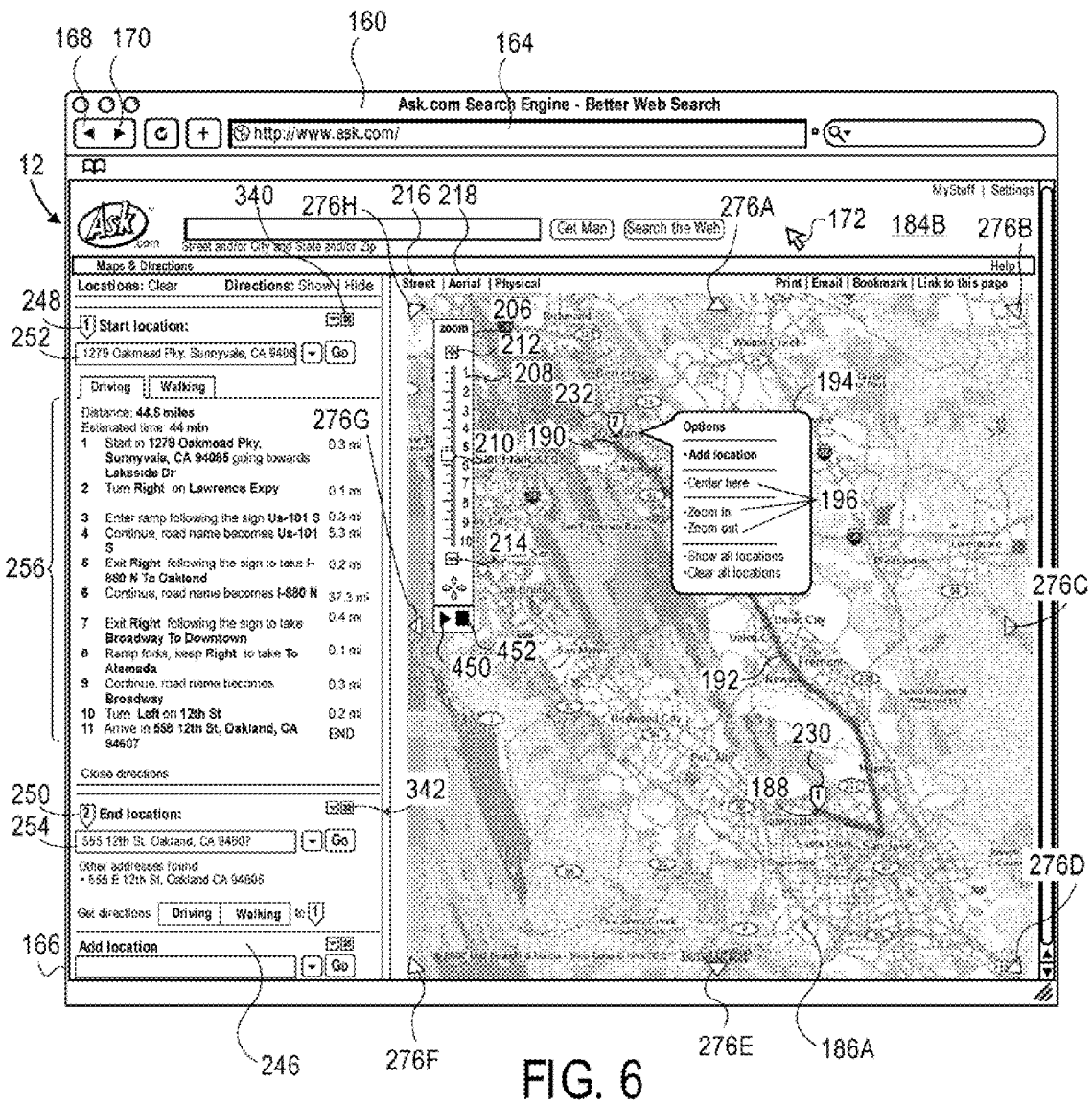
FIG. 6 is a view of the user interface, further illustrating the use of a selection window with a plurality of alternatives.

FIG. 6 illustrates a further view 184B of the user interface 12. The user has moved the cursor to a selected location (in the present example on the "d" of "Oakland") and has subsequently clicked a right button on the mouse. A selection window 194 opens upon clicking of the right button of the mouse. A plurality of alternatives 196 are displayed within the selection window 194. The alternatives 196 include "Add location", "Center here", "Zoom in", "Zoom out", "Show all locations", and "Clear all locations."

Figure 7:
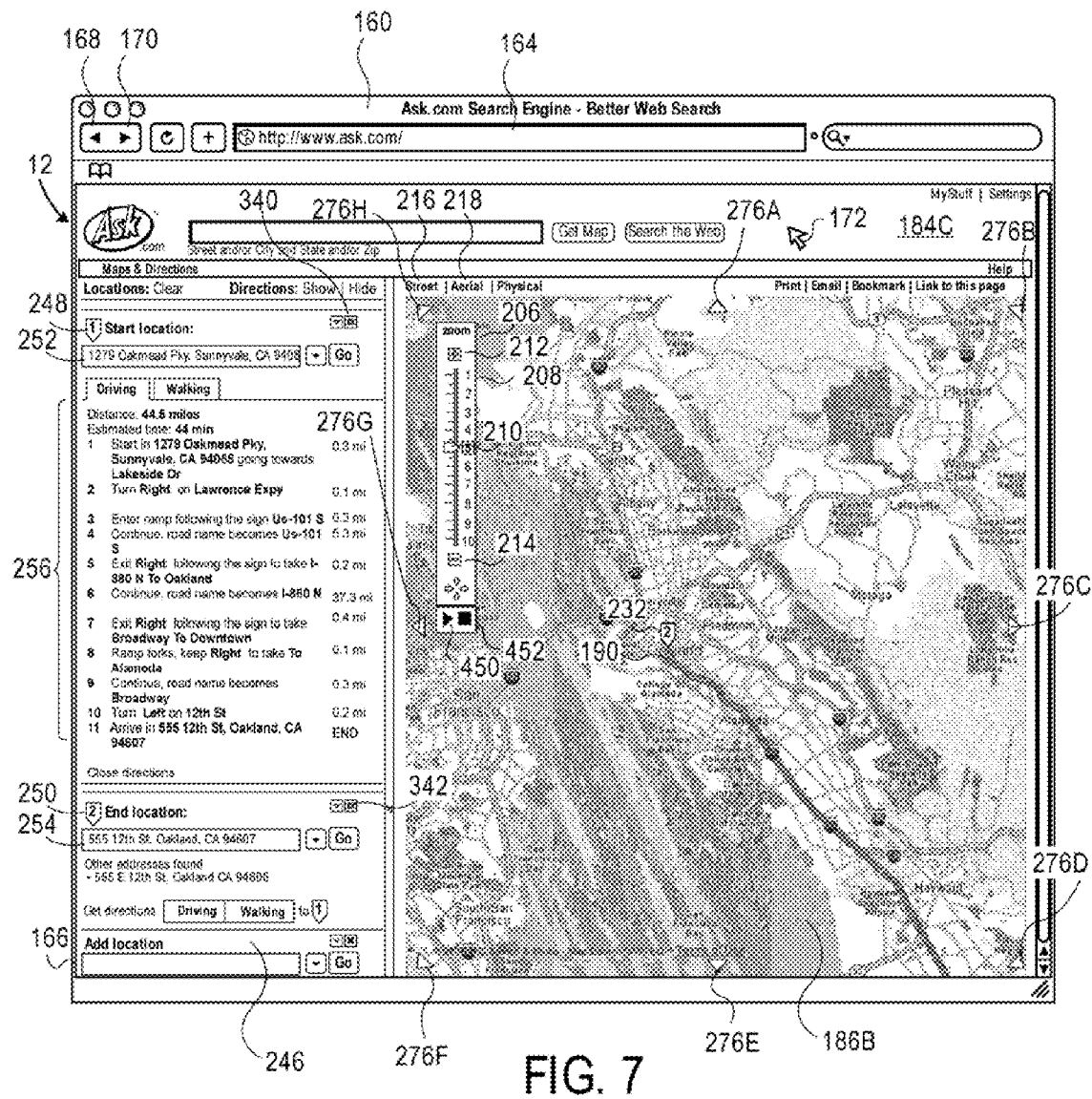
FIG. 7 is a view of the user interface after zooming in on an area of a map.

FIG. 7 illustrates a further view 184C of the user interface 12 upon selection of the "Zoom in" alternative 196 in FIG. 6. The view 184C includes a map 186B. When comparing the maps 186B of FIG. 7 and 186A of FIG. 6, it can be seen that the "d" of Oakland is not located in the center of the map 186A of FIG. 6, and is located in the center of the map 186B of FIG. 7. It can also be seen that the map 186B of FIG. 7 is zoomed in relative to the map 186A of the FIG. 6, so that details of the map 186B are enlarged relative to the same details in the map 186A. Portions of the map 186A of FIG. 6 are not displayed on the map 186B of FIG. 7, but the maps 186A and 186B of FIGS. at 6 and 7 have overlapping areas. In particular, it should be noted that only a portion of the path 192 is shown on the map 186B, but not the start location 188 of FIG. 6. Selection of the "Zoom out" alternative 196 in FIG. 6 will result in a view with a map that is centered at the "d" of "Oakland", but the zoomed out relative to the map 186A of FIG. 6.

Figure 8:
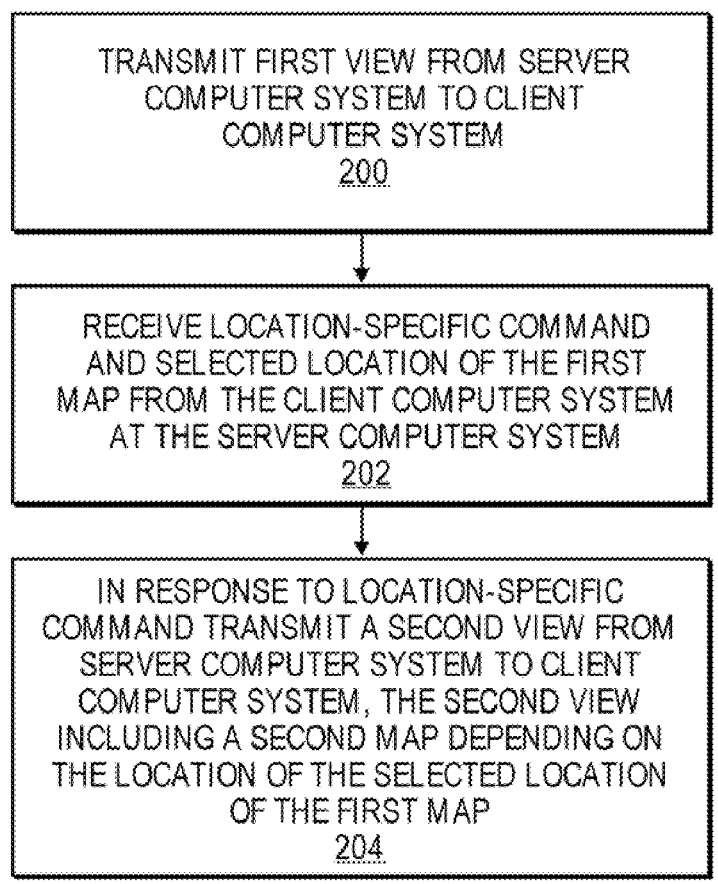
FIG. 8 is a flowchart illustrating how the selection window of FIG. 6 is used to zoom into the map as shown in FIG. 7.

FIG. 8 shows the method or process from a server point of view for generating the maps 186A and 186B of FIGS. 6 and 7. FIG. 8 thus illustrates how the server computer system 16 of FIG. 1 interfaces with one of the client computer systems 18. In step 200, the first view (184B) is transmitted from the server computer system to the client computer system. The user at the client computer system subsequently opens the selection window 194 at the location corresponding to the "d" in "Oakland" and selects one of the alternatives 196, in the present example "Center here". The a longitude and latitude of the "d" of "Oakland" and a "Center here" location specific command are then transmitted from the client computer system to the server computer system. At step 202 the location specific command and the selected location (coordinates) of the first map "186A" are received from the client computer system at the server computer system. At step 204, and in response to step 202, the server computer system transmits a second view (184C) to the client computer system. The second view includes a second map (186B). The second map depends on the location (coordinates) of the selected location (the "d" in "Oakland") of the first map, because the second map is centered at this location and zoomed in around this location.

The views 184B and 184C of FIGS. 5, 6 and 7 have a zooming tool 206 on the map 186A and the map 186B. The zooming tool 206 has a vertical scale 208, a pointer 210 and "+" and "−" symbols 212 and 214. The scale 208 is numbered from 1 to 10 with 1 at the top closest to the "+" symbol 212 and with 10 at the bottom closest to the "−" symbol 214. The pointer 210 is at about 5.5 in FIG. 6 and at about 5.0 in FIG. 7. A position of the pointer 210 higher on the scale 208 represents zooming in at more detail.

Figure 9:
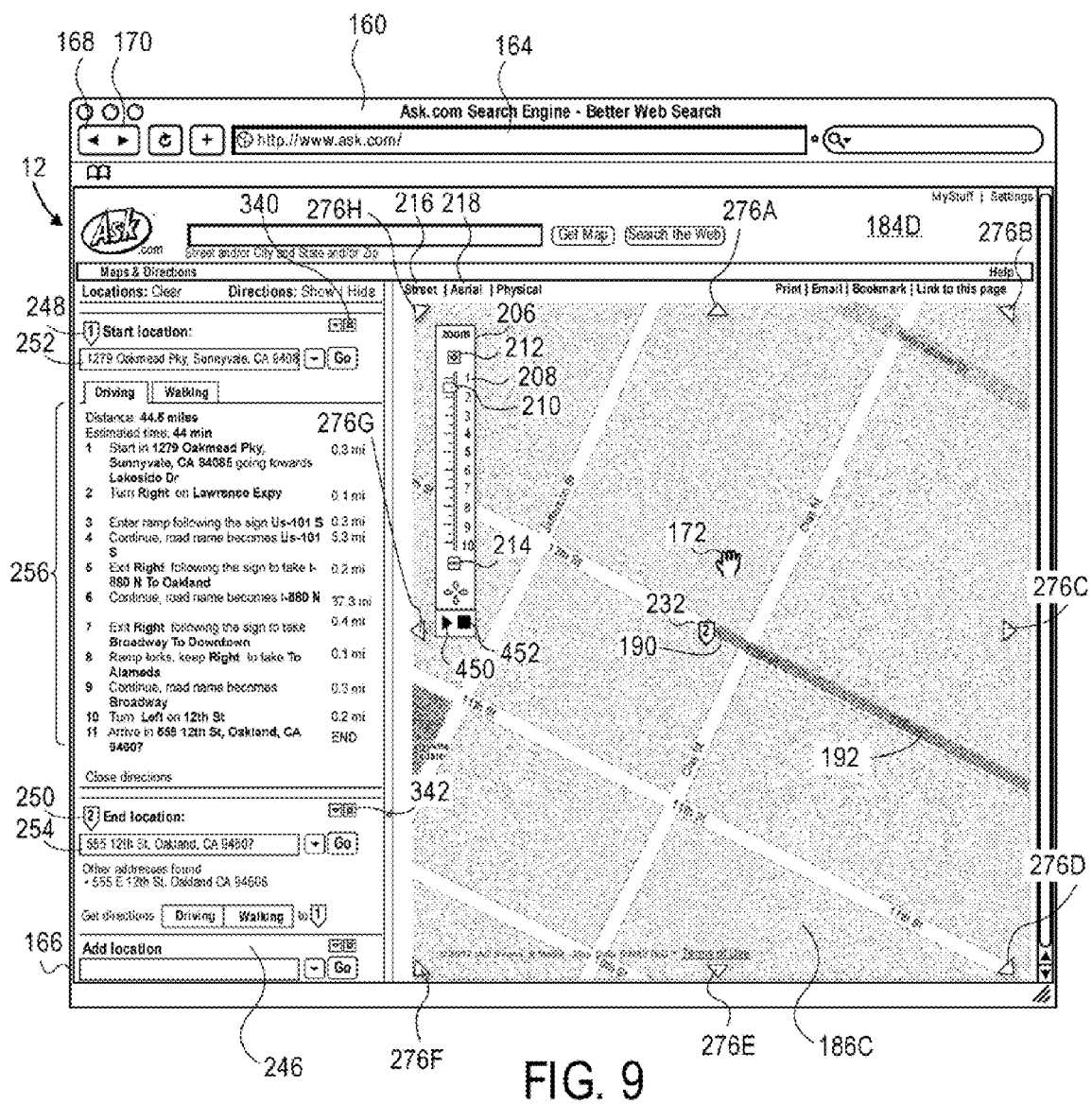
FIG. 9 is a view of the user interface after further zooming in on the map.

FIG. 9 illustrates a further view 184D of the user interface 12. The view 184D has a map 186C that is the same as the map 186B of FIG. 7, except that the map 186C is further zoomed in at the end location 190. The view 184D and the map 186C of FIG. 9 can be obtained by again opening a selection window, as described with reference to FIG. 6, selecting the "+" symbol 212 in FIG. 6, or by "grabbing" the pointer 210 in FIG. 6, "dragging" the pointer 210 upward, and "dropping" the pointer 210 at approximately 1.5 on the scale 206.

The view 184D also includes a "street" selector 216 and an "aerial" selector 218. The cursor 172 has an arrow shape when mousing over the "street" selector 216, indicating that the "street" selector 216 is not active. The cursor 172 turns into a pointed hand when mousing over the "aerial" selector 218, indicating that the "aerial" selector 218 is active.

Figure 10:
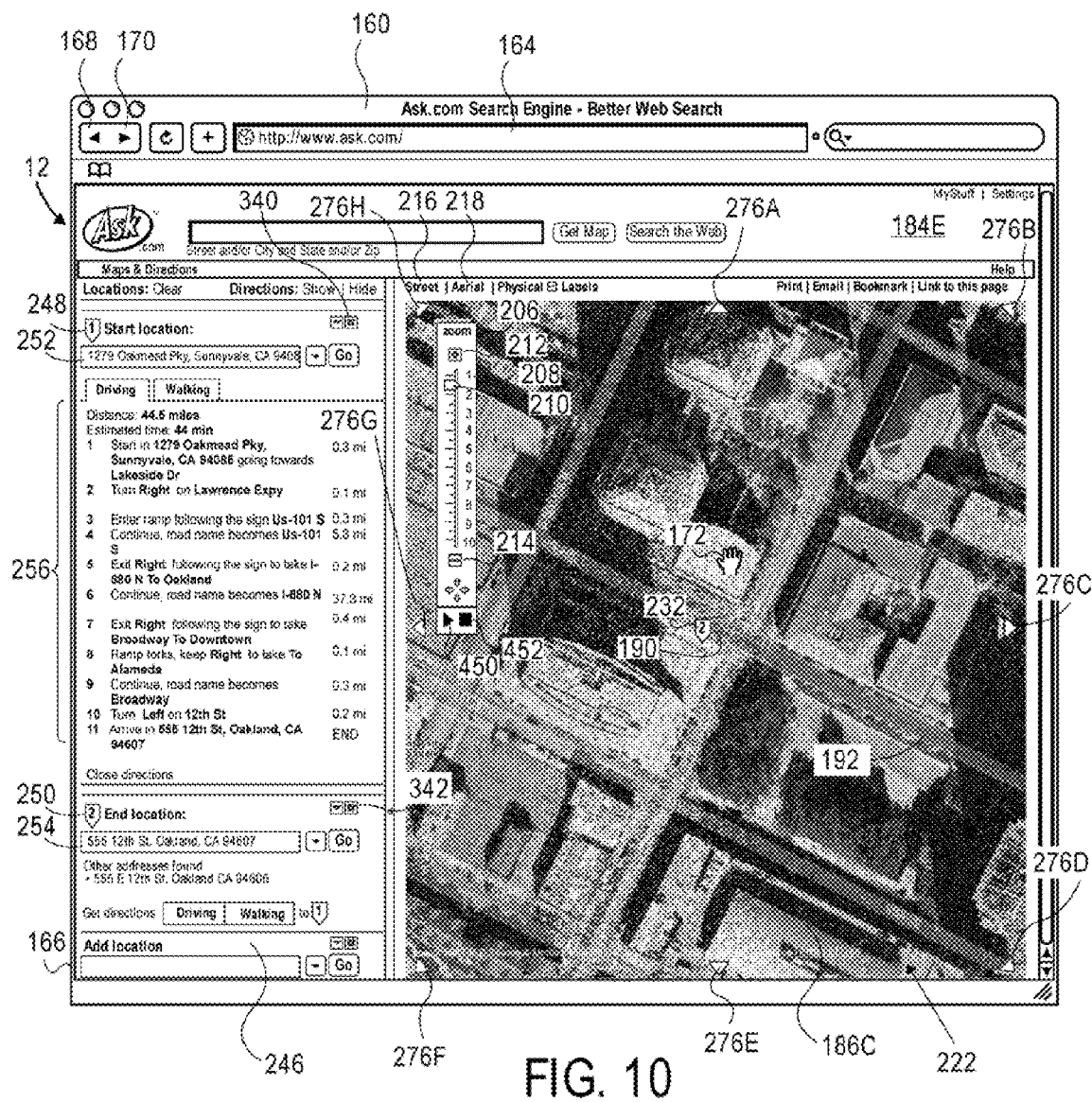
FIG. 10 is a view of the user interface, illustrating the use of an aerial photograph.

FIG. 10 is a view 184E of the user interface 12 that appears after selection of the "aerial" selector 218 in FIG. 9. The view 184E includes an aerial photograph 222 with the street map 186C of FIG. 9 super interposed on top of the aerial photograph 222. Because the aerial photograph 222 is of the same area that is represented in the map 186C of FIG. 9, streets and roads of the map 186C fall directly on streets and roads of the aerial photograph 222. Street names included in the street map 186C of FIG. 9 are also included in the view 184E of FIG. 10. The aerial photograph 222 includes details beyond what are shown in the street map 186C of FIG. 9, such as buildings, trees, parking lots etc. When mousing over the "aerial" selector 218, the cursor 172 will turn into an arrow, indicating that the "aerial" selector 218 is not active or selectable. The cursor 172 turns into a pointed hand when mousing over the "street" selector 216, indicating that the "street" selector 216 is active, and selection of the "street" selector 216 returns the user interface 12 to the view 184B of FIG. 9.

Figure 11:
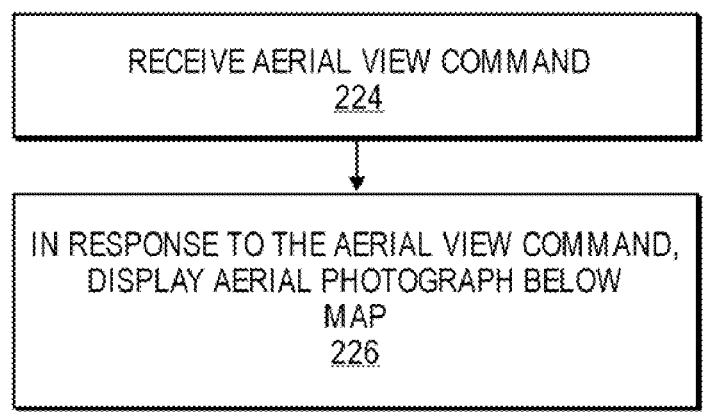
FIG. 11 is a flowchart illustrating how the aerial photograph is obtained.

FIG. 11 illustrates further details of how the server computer system 16 of FIG. 1 interfaces with the client computer system 18. Upon selection of the "aerial" selector 218 in FIG. 9, an aerial view command is transmitted from the client computer system 18 to the server computer system 16. At step 224, the aerial view command is received at the server computer system 16. At step 226, in response to the aerial view command received in step 224, the aerial photograph 222 is displayed below the map 186C. The aerial photograph 222 is displayed below the map 186C by transmitting at least portions of the view 184E from the server computer system 16 to the client computer system 18 and replacing at least those portions of the view 184D of FIG. 9.

Referring again to FIG. 5, it can be seen that the view 184A includes start and end location markers 230 and 232 located at the start and end locations 188 and 190, respectively. Both markers 230 and 232 are also present in the view 184B of FIG. 6, but only the end location marker 232 is viewable within the confines of the maps 186B and 186C of the views 184C, 184D and 184E of FIGS. 7, 9 and 10.

In the view 184E of FIG. 10, the end location marker 232 is located in front of a building at 555 Twelfth Street. The cursor 172 is in the form of an open hand. The cursor 172 can be positioned on the end location marker 232 and changes from an open hand shape to a closed hand when the left button on the mouse is selected and held in. The closed hand shape of the cursor 172 indicates that the end location marker 232 is attached to the cursor 172. The end location marker 232 can then be "dragged", or moved by moving the mouse while holding the left button of the mouse in (the end location marker 232 moves together with the cursor 172). The cursor 172 is released from the end location marker 232 by releasing the left button on the mouse. The cursor 172 then returns to the shape of an open hand, indicating that the cursor 172 and the end location marker 232 are not attached to one another. The end location marker 232 will then remain in a stationary position on the map 186C upon movement of the cursor 172.

Figure 12:
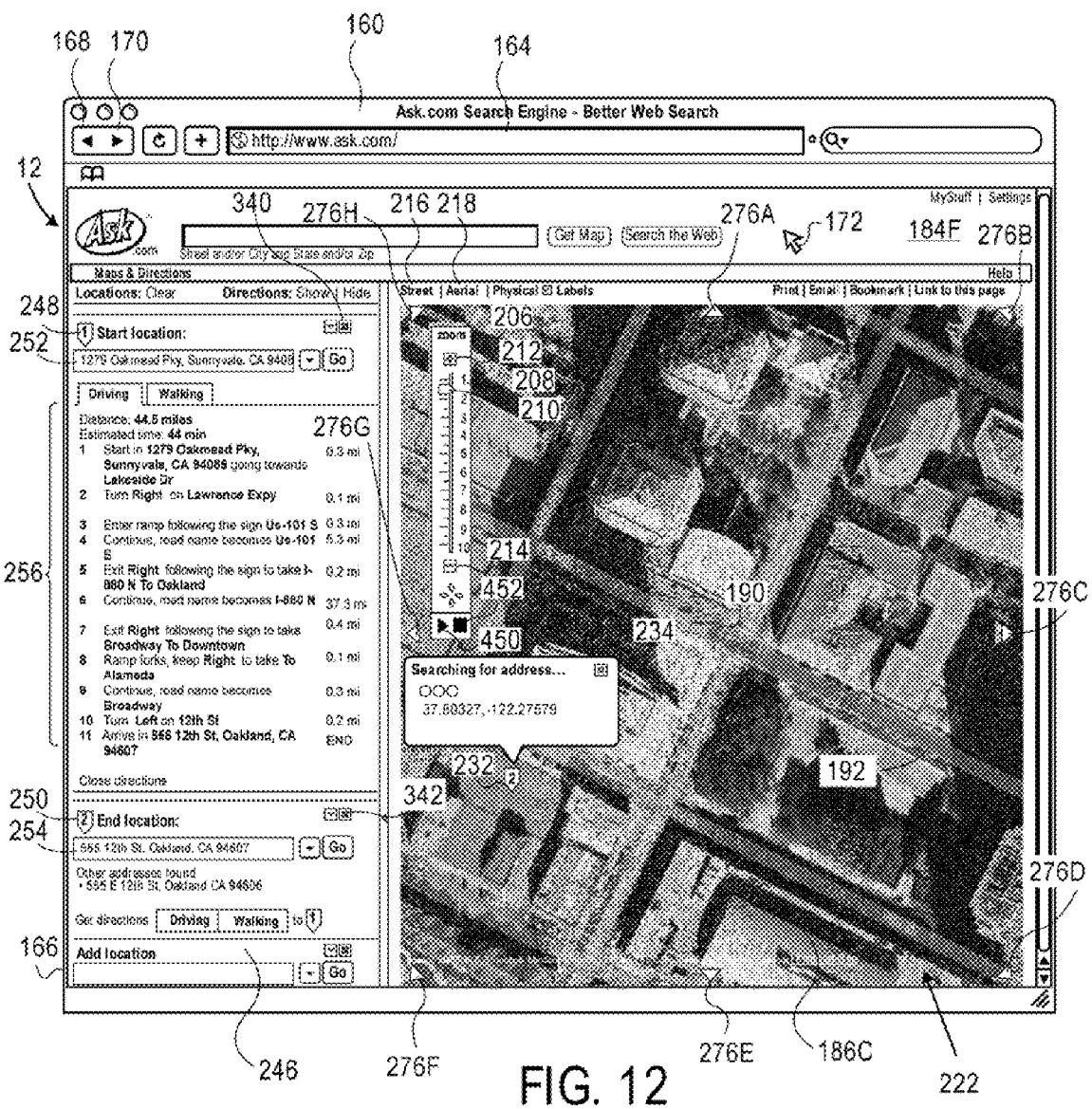
FIG. 12 is a view of the user interface after a location marker is dragged from one location to another location.

Referring to FIG. 12, the end location marker 232 is moved from the location thereof on Twelfth Street in FIG. 10 to a parking lot, on the opposite side of the building, on Eleventh Street. A target address area window 234 appears at the end location marker 232 as soon as the end location marker 232 is dropped at a first target location on the parking lot. A first target location of the end location marker 232, i.e. longitude and latitude (37.80327, −122.27579) are transmitted from the client computer system 18 in FIG. 1 to the server computer system 16. As mentioned previously, one of the structured databases 26 is a map database holding addresses and their respective longitude and latitude. The search engine 28 searches for coordinates (longitude and latitude) in the structured database 26 for a street intersection that most closely match the coordinates of the end location marker 232. The coordinates for the street intersection closest end location marker 232 in the structured database 26 may for example be "37.80217, −123.72597" and these coordinates together with the associated address are transmitted by the search engine over the internet 14B to the client computer system 18. The view 184F of FIG. 12 is the same as the view 184E of FIG. 10 in all other respects. In particular, it should be noted that the path 192 is present and is in the same locations in the views of 184E and 184F of FIGS. 10 and 12.

Figure 13:
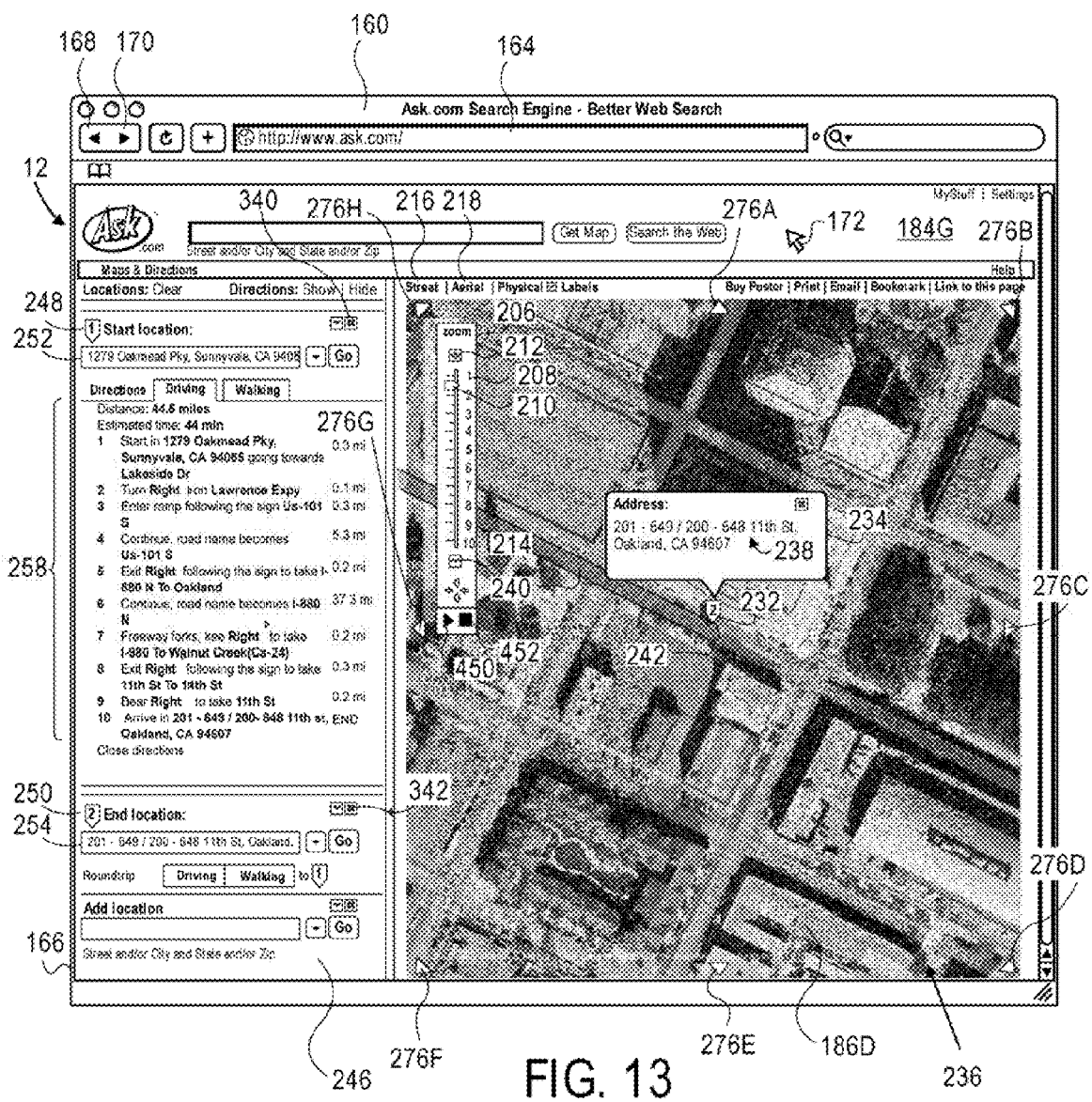
FIG. 13 is a view of the user interface after an address of the location marker is found.

FIG. 13 is a further view 184G of the user interface 12 and includes a new map 186D on an aerial photograph 236. The end location marker 232 is located at a second target location, at the coordinates of a street section, that most closely matched the coordinates of the parking lot of FIG. 12. The target address area window 234 is moved together with the end location marker 232 to the second target location. An address 238 is located in the target address area window 234, and is the address that is extracted from the structured database 26 of FIG. 1 for the new location of the end location marker 232 in the view 184G.

The search engine 28 in FIG. 1 has also calculated a new path 240 from the start location 188 in FIG. 5 to a new end location 242 corresponding to the location of the end location marker 232 in the view 184G. A portion of the new path 240 is displayed on the map 186D and the aerial photograph 236 of the view 184D of FIG. 13. The portion at the initial path 192 shown in the view 184F of FIG. 12 is not displayed in the view 184G of FIG. 13.

Reference is again made to FIG. 5. The view 184A has a pane 246 to the left of the map 186A. The pane 246 has a start location heading 248, an end location heading 250, a start location search box 252 at the start location heading 248, an end location search box 254 at the end location heading 250, and driving directions 256 between the start location heading 248 and the end location heading 250. The address entered in the start location search box 178 in FIG. 4 also appears in the start location search box 252 in FIG. 5 and the address entered in the end location search box 180 in FIG. 4 also appears in the search box 254 of FIG. 5. The search engine 28 in FIG. 1 calculates the driving directions 258 when the search engine 28 calculates the path 192. The driving directions 256 are driving directions from one intersection to the next for following the path 192. The same driving directions 256 appear in the views 184A-F of FIGS. 5-7, 9-11 and 12.

Upon finding the address 238 ultimately shown in the view 184G of FIG. 13, the search engine 28 also calculates new driving directions 258, which are displayed between the start location heading 248 and the end location heading 250 in the view 184G of FIG. 13. The address displayed in the end location search box 254 is also updated to correspond with the address 238 in the target address area window 234.

Figure 14:
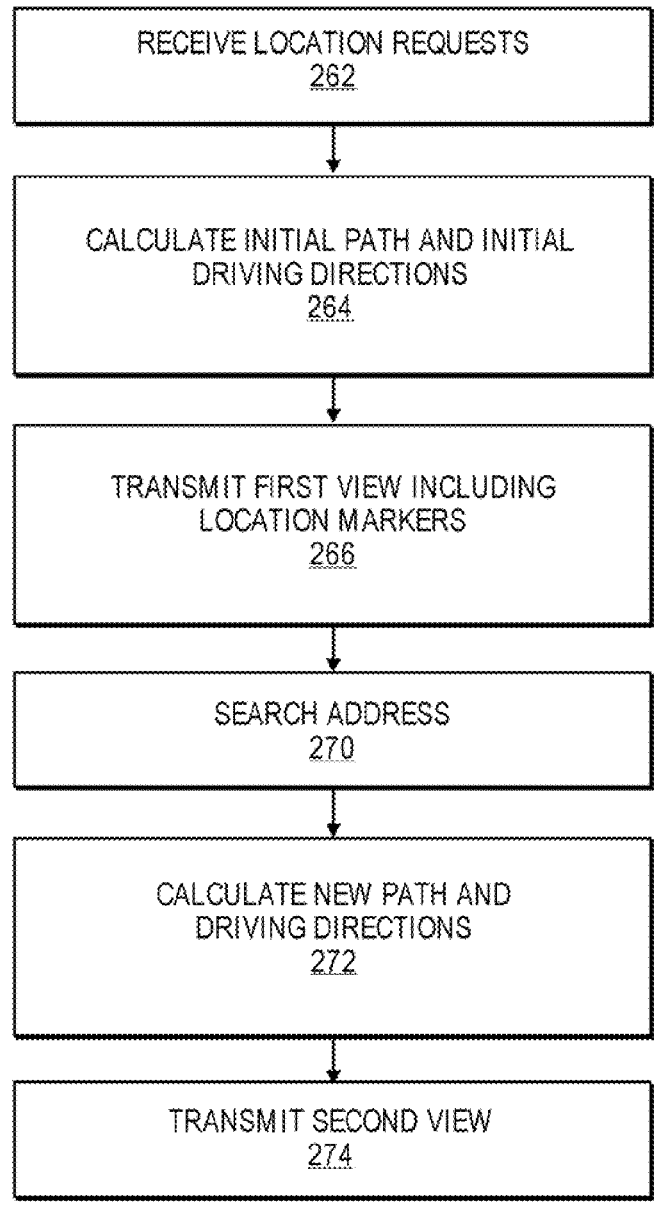
FIG. 14 is a flowchart illustrating how the location marker is placed and the address is found.

FIG. 14 illustrates a method according to which the server computer system 16 of FIG. 1 interfaces with a client computer system 18 in the views of FIGS. 4, 5, 12 and 13. In FIG. 4, selection of the "Go" button 182 causes transmission of two location requests from the client computer system 18 in FIG. 1 to the server computer system 16. The first location request has the address entered into the start location search box 178 and the second location request has the address entered into the end location search box 180. At step 262 the location requests are received at the server computer system 16. At step 264, the server computer system calculates the initial path 192 and the initial driving directions 256. The server computer system 16 then transmits a first view, e.g. the view 184A of FIG. 5 including the initial path 192, the initial driving directions 256 and the location markers 230 and 232 to the client computer system 18. Following movement of the end location marker 232 as described with reference to FIG. 12, the client computer system 18 automatically transmits a marker moving command together with the coordinates of the parking lot in FIG. 12 to the server computer system 16. At step 268 the marker moving command and coordinates are received at the server computer system 16.

At step 270 the server computer system 16 searches for the address 238. At step 272, the server computer system 16 calculates the new path 240 and the new driving directions 258. At step 274, the server computer system transmits a second view, i.e. the view 184G to the client computer system 18. The second view 184G includes the address 238, the new path 240, and the new driving directions 258.

Figure 15:
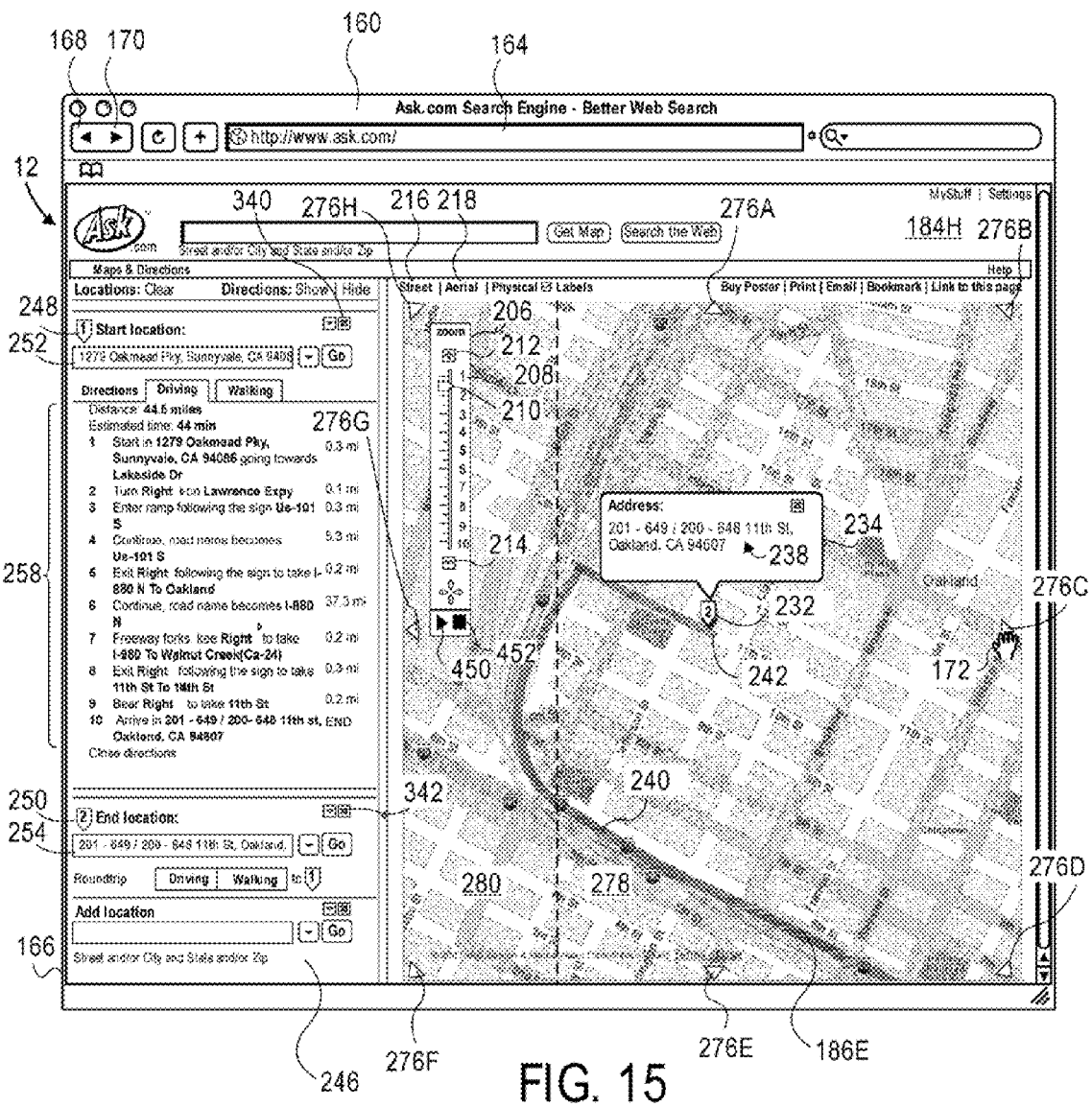
FIG. 15 is a view of the user interface illustrating the use of a directional indicator to move a map.

FIG. 15 is a further view 184H of the user interface 12. The aerial photograph 236 in FIG. 13 is removed by selecting the "street" selector 216. The view 184H also has a map 186E that is zoomed out relative to the map 186D of FIG. 13. Zooming out can, for example, be accomplished by selecting the "−" symbol 214 in the view 184G of FIG. 13.

The view 184H also has a plurality of directional indicators 276A-H. The director indicators 276A-H are located respectively at north, northeast, east, southeast, south, southwest, west, and northwest edges or corners of the map 186E. The directional indicators 276A-H are in the form of triangles that point respectively north, northeast, east, southeast, south, southwest, west, and northwest. The only areas of the map 186E that are visible are a area 278 on the right and a smaller area 280 on the left.

Figure 16:
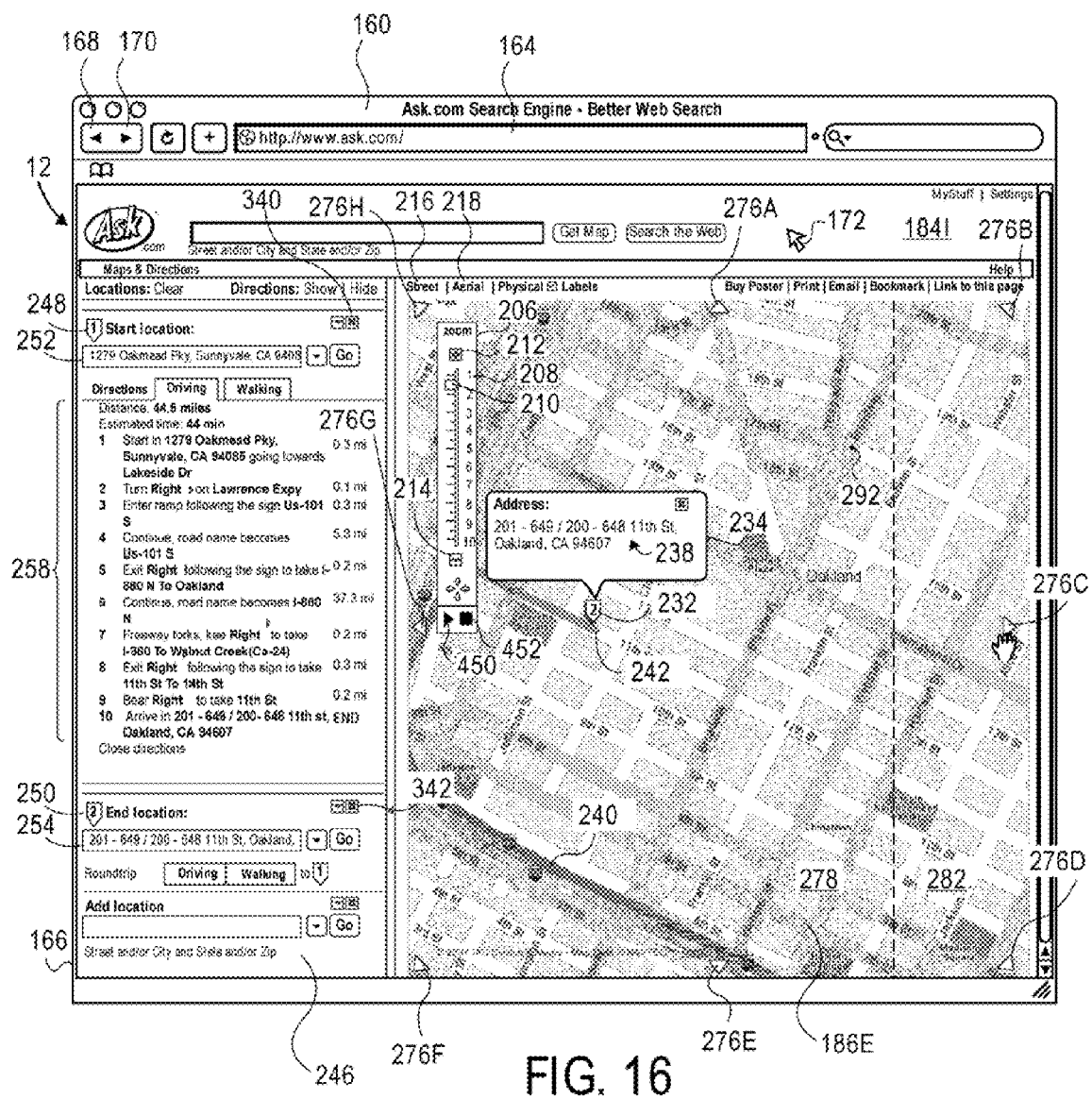
FIG. 16 is a view of the user interface after use of the directional indicator.

FIG. 16 illustrates a further view 184I of the user interface 12, which is obtained by selecting the directional indicator 276C in the view 184H of FIG. 15. A further area 282 of the map 186E is now located on the right and the area 278 is located to the left of the smaller area 282. The area 280 shown in the view 184H of FIG. 15 is not shown in the view 184I of FIG. 16. The area 278 is thus the only overlapping area of the map 186E in the views 184H and 184I of FIGS. 15 and 16. The entire map 186E has thus moved to the left, together with the path 240, the end location 242, the end location marker 232 and the target address area window 234.

Selection of a respective one of the directional indicators 276A-H determines the direction that the map 186E moves. In the given example, the directional indicator 276C, signifying east, is selected to move the map 186E to the left. Similarly, the directional indicator 276A, signifying north, can be selected to move the map 186E down to bring an upper area of the map 186E into view and remove a lower area of the map 186E from the view. Selection of the directional indicator 276B will move the map 186E diagonally to the bottom left. Portions to the right and to the top of the map 186E will come into view and areas to the left and at the bottom will be removed from the view.

Figure 17:
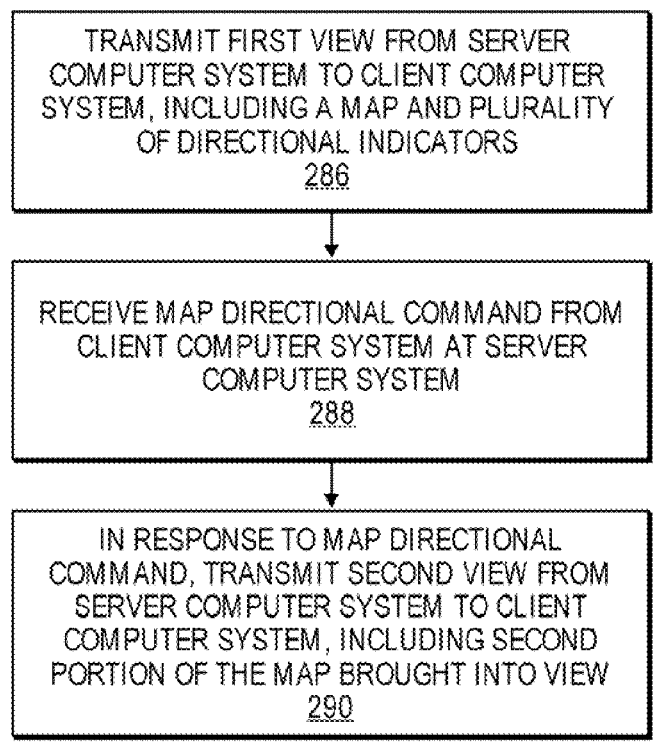
FIG. 17 is a flowchart illustrating how use of the directional indicator moves the map.

FIG. 17 illustrates a method according to which the server computer system 16 of FIG. 1 interfaces with the client computer system 18 to generate the views 184H and 184I of FIGS. 15 and 16. At step 286, the server computer system 16 transmits a first view, i.e. the view 184H from the server computer system 16 to the client computer system 18, including the map 186E and the directional indicators 276A-H. The user then uses the mouse to select one of the directional indicators 276A-H, for example the directional indicator 276C. Upon selection of the directional indicator 276C, a respective map directional command is transmitted from the client computer system 18 to the server computer system 16. The respective map directional command will differ depending on which one of the directional indicators 276A-H is selected. At step 288, the map directional command that is transmitted from the client computer system 18 is received at the server computer system 16. At step 290, and in response to the map directional command, the server computer system 16 transmits a second view, i.e. the view 184I from the server computer system 16 to the client computer system 18. The first view 184H in FIG. 15 includes a first area 278 of the map 186E and the second view 184I includes a second area 282 of the map 186E. The server computer system 16 can differentiate between eight different directional commands so that the view 184I will depend on the directional command as dictated by the respective directional indicator 276A-H that is selected by the user.

Referring again to FIG. 16, the cursor 172 is in the form of an arrow when the cursor 172 is located on an area outside of the map 186E. The movement of the cursor 172 onto the map 186E, changes the shape of the cursor 172 to an open hand, i.e. similar to the shape of the cursor 172 in FIG. 15. The arrow shape of the cursor 172 indicates that the map 186E is not selectable, whereas the open hand indicates that a location on the map 186E is selectable. An example of selection of a location on a map has been described with reference to FIG. 6, wherein the right button on the mouse is used to select a location on the map and open the selection window 194. The left button on the mouse can also be used to select a location on the map 186E away from the location marker 232. For example, the cursor 172 can be placed at a location 292 on Broadway near an intersection with Telegraph Avenue, and the left button on the mouse can be depressed to change the shape of the cursor 172 from an open hand to a closed hand, indicating that the location 292 is attached to the cursor 172.

Figure 18:
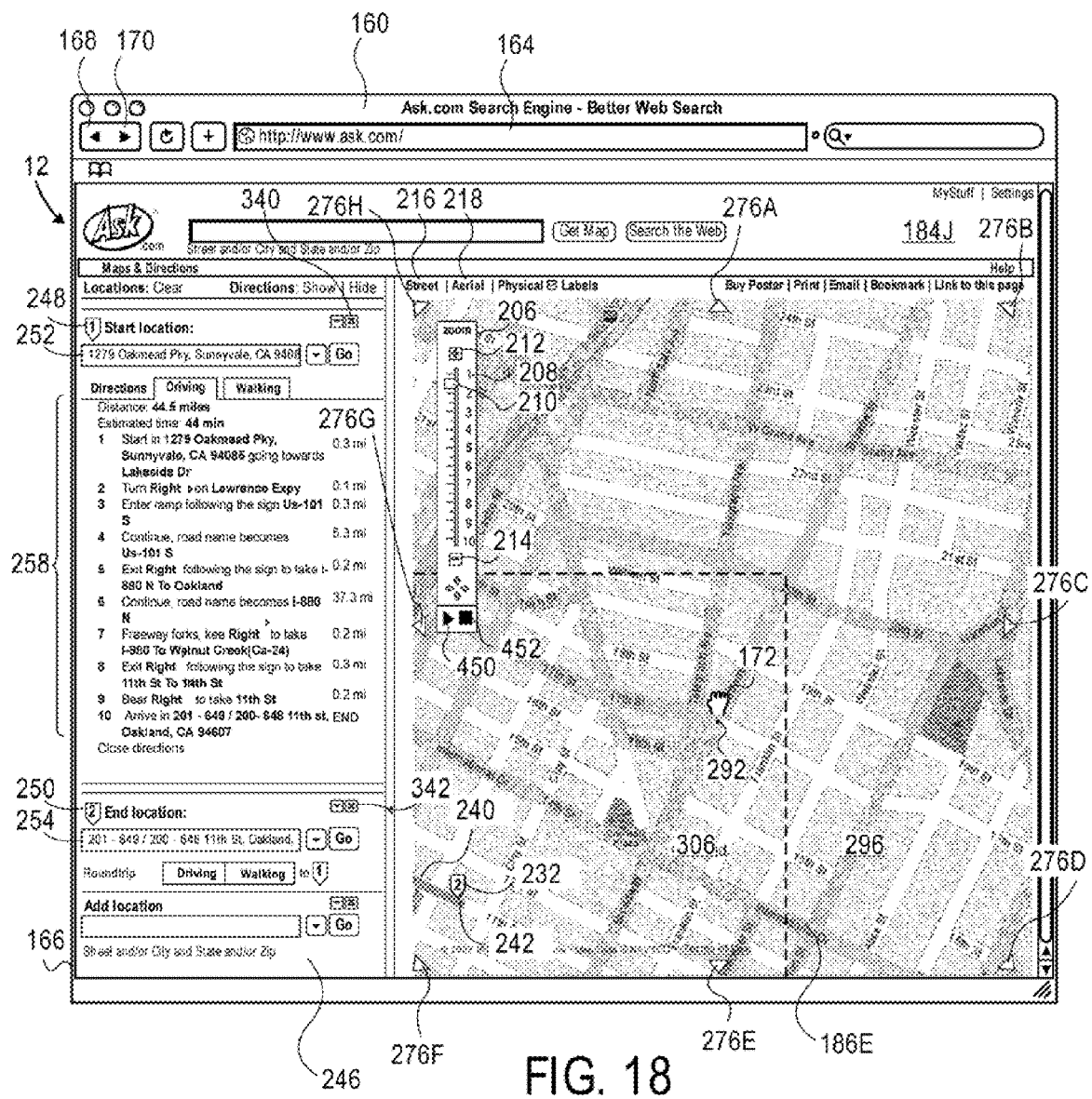
FIG. 18 is a view of the user interface illustrating how the map is moved or "dragged" with a cursor.

FIG. 18 is a view 184J of the user interface 12 that is generated upon movement of the cursor 172 in a downward and left, or southwest direction while holding the left button on the mouse down. A viewable area of the map 186E in the view 184I of FIG. 16 is moved or "dragged" together with the cursor 172 in a downward and left, southwest direction. Another area 296 of the map 186E to the right and above the viewable area in the view 184I of FIG. 16 appears in the view 184J of FIG. 18. The map 186E has thus moved relative to a frame defined to the left by the pane 246 of the remainder of the user interface 12 and to the right, bottom and top by the viewing pane 162 of the browser 160, all of which remain stationary.

Release of the left button of the mouse changes the cursor 172 from a closed hand to an open hand, indicating that the location 292 is released from the cursor 172. The map 186E has thus been "dropped" into the position shown in the view 184J of FIG. 18 and the cursor 172 can move freely across the map 186E and the remainder of the user interface 12.

It will be understood that the shapes of the cursor are exemplary and that a free shape, other than an open hand, an active shape other than a closed hand, and an inactive shape other than an arrow may be used.

Figure 19:
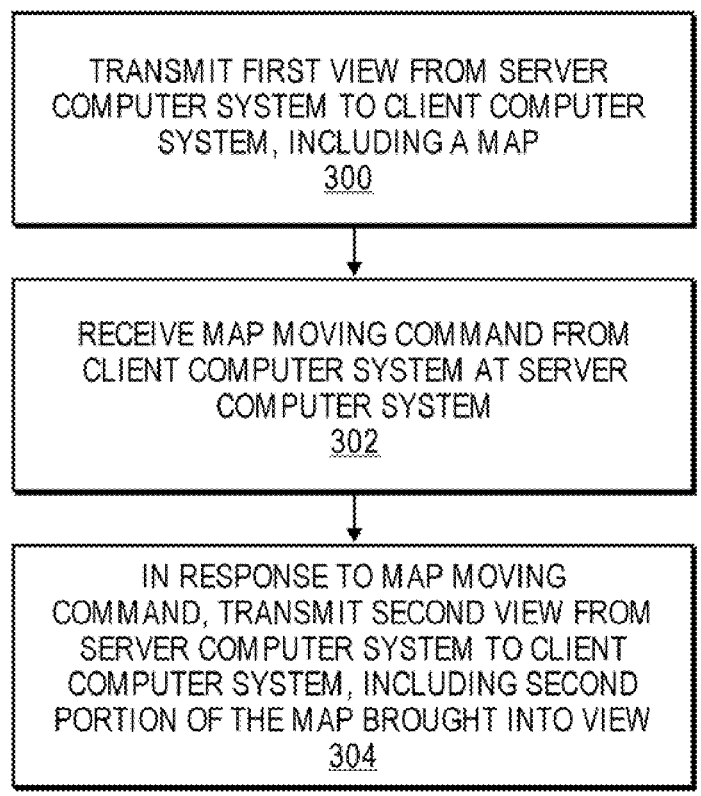
FIG. 19 is a flowchart illustrating how movement of the cursor drags the map.

FIG. 19 illustrates the manner according to which the server computer system 16 of FIG. 1 interfaces with a client computer system 18 to render and generate the views 184I and 184J of FIGS. 16 and 18. At step 300, a first view, i.e. the view 184I, is transmitted from the server computer system 16 to the client computer system 18, including the map 186E of the view 184I. The user then selects the location 292 with the cursor and moves the cursor so that the location 292 moves together with and due to the cursor. Movement of the cursor transmits a map moving command from the client computer system 18 to the server computer system 16. At step 288, the map moving command is received from the client computer system at the server computer system. At step 290, and in response to the map moving command, the server computer system 16 transmits a second view, i.e. the view 184J, or at least the area 296, from the server computer system 16 to the client computer system 18. The second area 296 of the map is thereby brought into view. The area 306 of the map 186E in the view of the 184J, other than the area 296, is the area that overlaps with the map 186E in the view 184I of FIG. 16. In a different manner of stating, the views 184I and 184J each show a respective area of the map 186E and there is an overlapping area 306 shown in the bottom left of the view 184J of FIG. 18.

Figure 20:
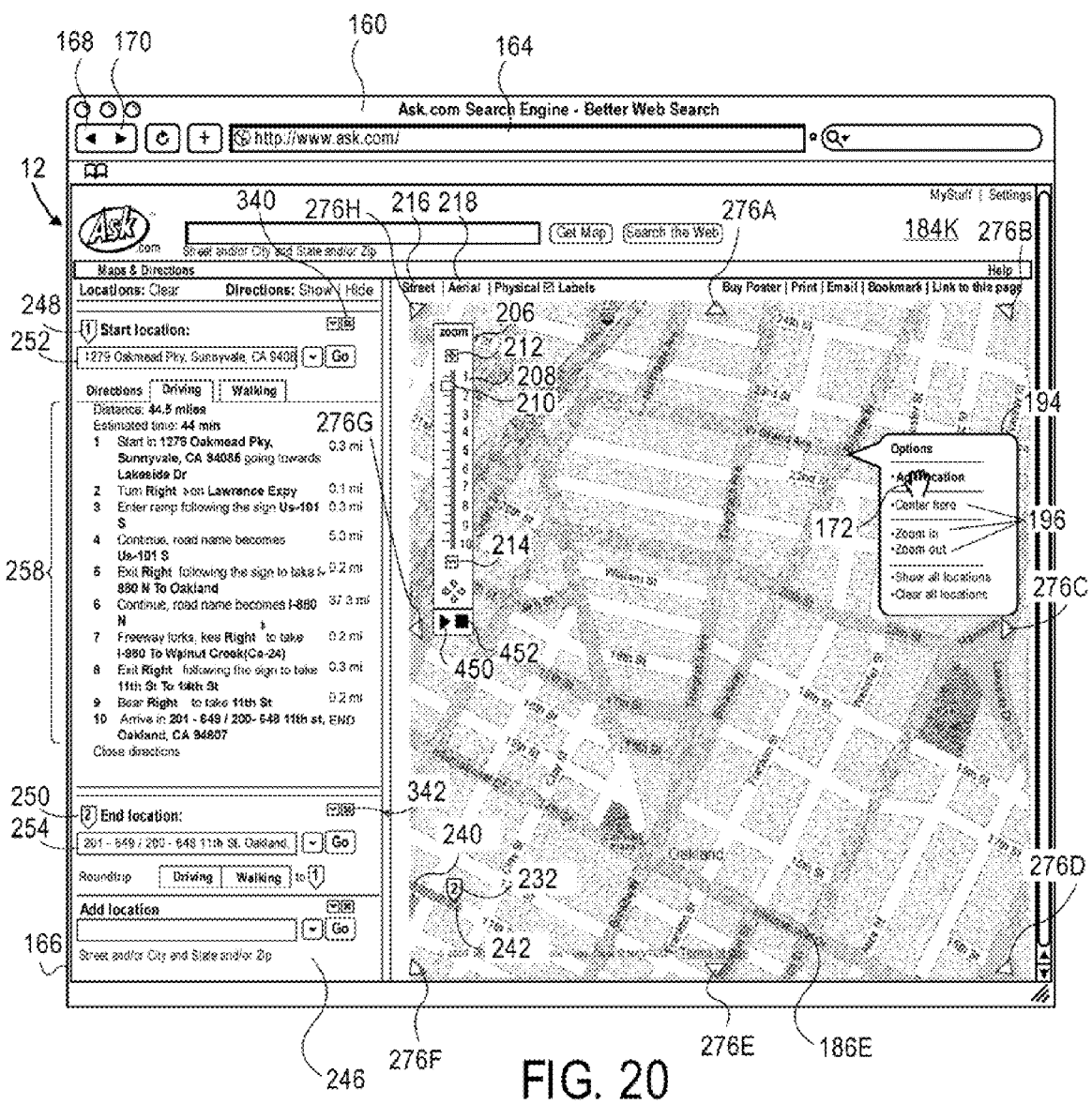
FIG. 20 is a view of the user interface illustrating the use of a selection window to add a location.

FIG. 20 illustrates a further view 184K of the user interface 12. The user has located the cursor at a target location at an intersection of Broadway and West Grand Avenue. The user has selected the right button on the mouse to open a selection window 194 on the map 186E. The selection window 194 in the view 184K of FIG. 20 is the same as the selection window 194 in the view 184B of FIG. 6. Functioning of the selection window 194, in particular interaction between the server computer system 16 in FIG. 1 and the client computer system 18, is also similar to the functioning described with reference to FIGS. 6, 7 and 8. The user moves the cursor 172 onto the alternative 196 entitled "Add location", and selects the alternative 196 "Add location."

Figure 21:
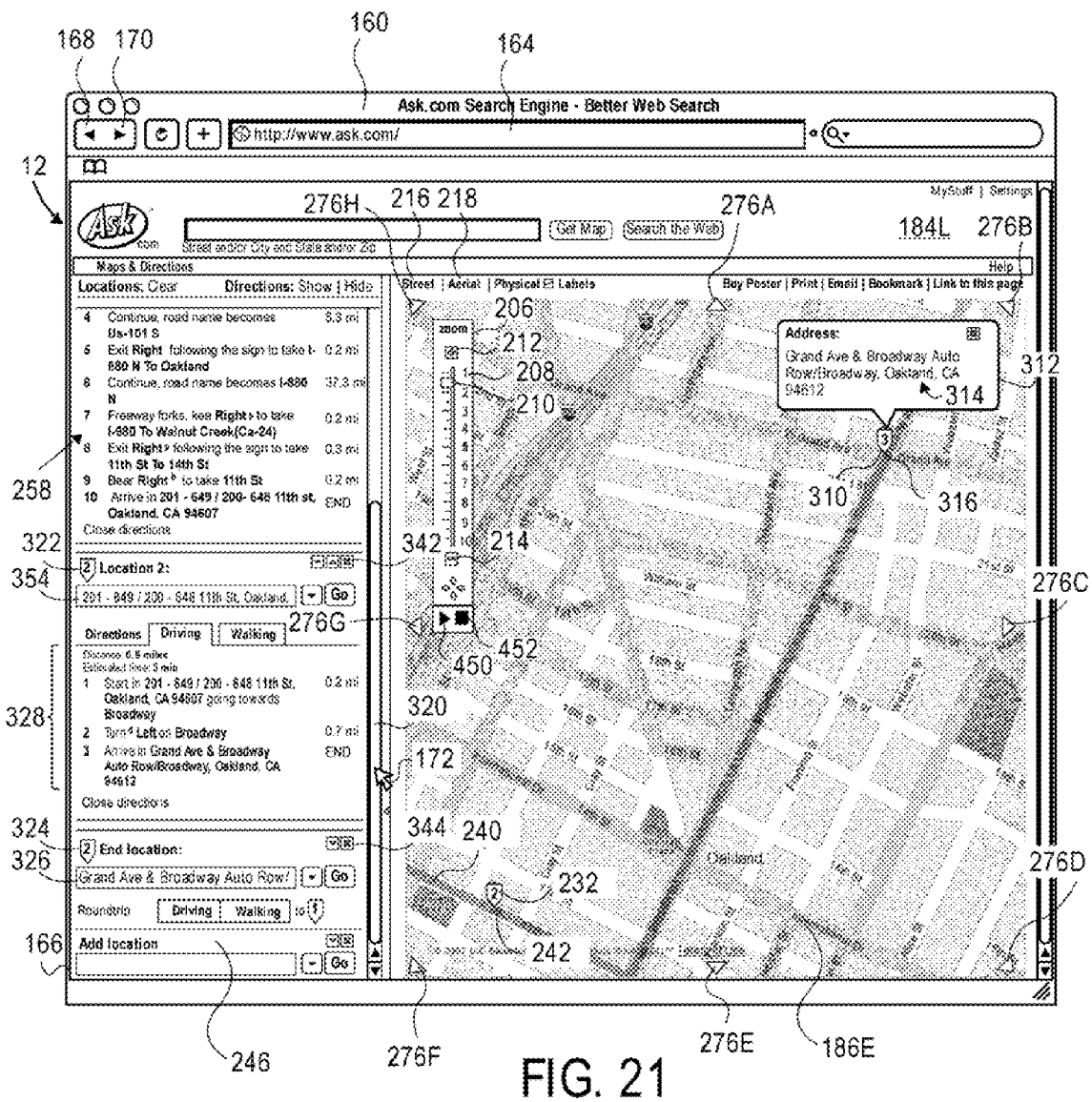
FIG. 21 is a view of the user interface after the location has been added.

FIG. 21 illustrates a further view 184L of the user interface 12 that appears after selection of the "Add location" alternative 196 in FIG. 20. The view 184L includes the same map 186E of the view 184K of FIG. 20. An end location marker 310 is now placed at or close to the intersection of Broadway and West Grand Avenue, which is the target location selected by the user in the view 184K of FIG. 20. A target address area window 312 with an address 314 within the target address area window 312 are also inserted at the end location marker 310. The end location marker 232 now becomes an intermediate location marker 232, the end location 242 is an intermediate location of the path 240 and the path 240 now extends to a new end location 316 at the end location marker 310. Details of how the address 314 is found are similar to the manner according to which the address 238 in the view 184G of FIG. 13 is obtained. Details of how the path 240 is calculated are similar to the manner according to which the path 192 in the view 184A of FIG. 5 is calculated.

A scroll bar 320 can be selected with the cursor 172 and be dragged down to show a lower area of the pane 246. A lower area of the pane 246 now includes an intermediate location heading 322 with the same address of the end location heading 250 in the view 184K of FIG. 20 entered in the same search box 254, but which has now become an intermediate location search box 254. A new end location heading 324 is now shown below the intermediate location heading 322 and a new end location search box 326 is provided at the end location heading with the address 314 in the target address area window also appearing in the end location search box 326. Additional driving directions 328 are also provided between the intermediate location heading 322 and the end location heading 324. The driving directions 328 are for following the path 240 from the intermediate location 242 to the end location 316 and from one intersection to the next.

Figure 22:
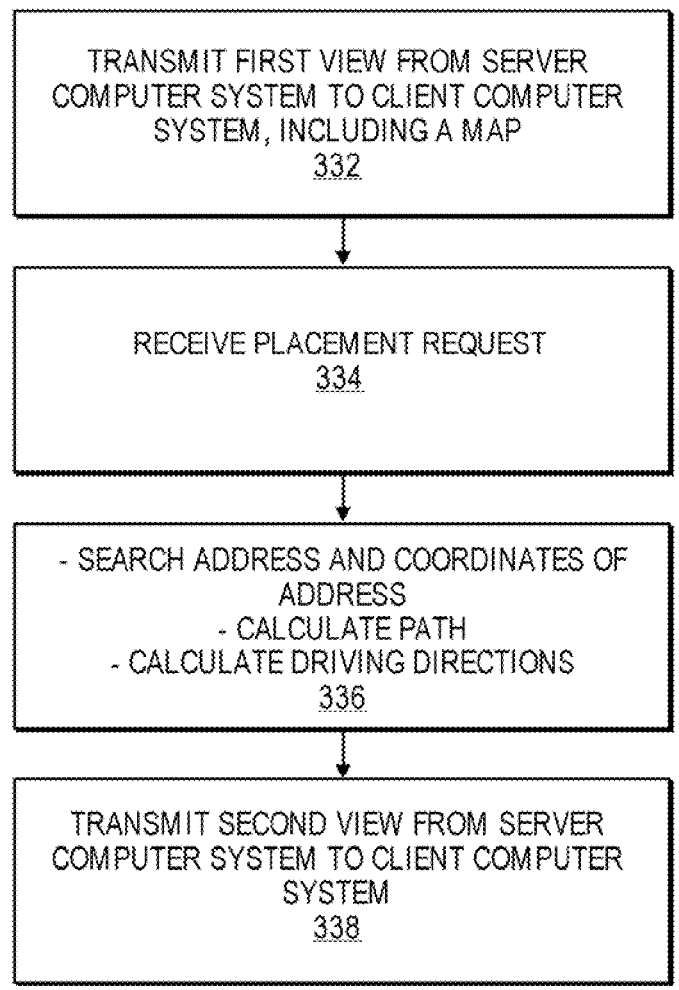
FIG. 22 is a flowchart illustrating how the location is added and what happens when the location is added.

FIG. 22 illustrates server side interfacing of the server computer system 16 in FIG. 1 with the line computer system 18. In step 332, a first view, i.e. the view 184K of FIG. 20, is transmitted from the server computer system 16 to the client computer system 18. Upon selection of the "Add location" alternative 196 in the view 184K of FIG. 20, a placement request is transmitted from the client computer system 18 to the server computer system 16. At step 334, the placement request is received from the client computer system 18 at the server computer system 16. At step 336, the server computer system searches an address and coordinates of the address corresponding to the location selected by the user in the view 184K of FIG. 20. The server computer system 16 also calculates the path 240, or at least a portion of the path 240 from the intermediate location 242 to the end location 316. The server computer system 16 also calculates the driving directions

328. At step 338, the server computer system transmits a second view, i.e. the view 184L of FIG. 21, to the client computer system.

Figure 23:
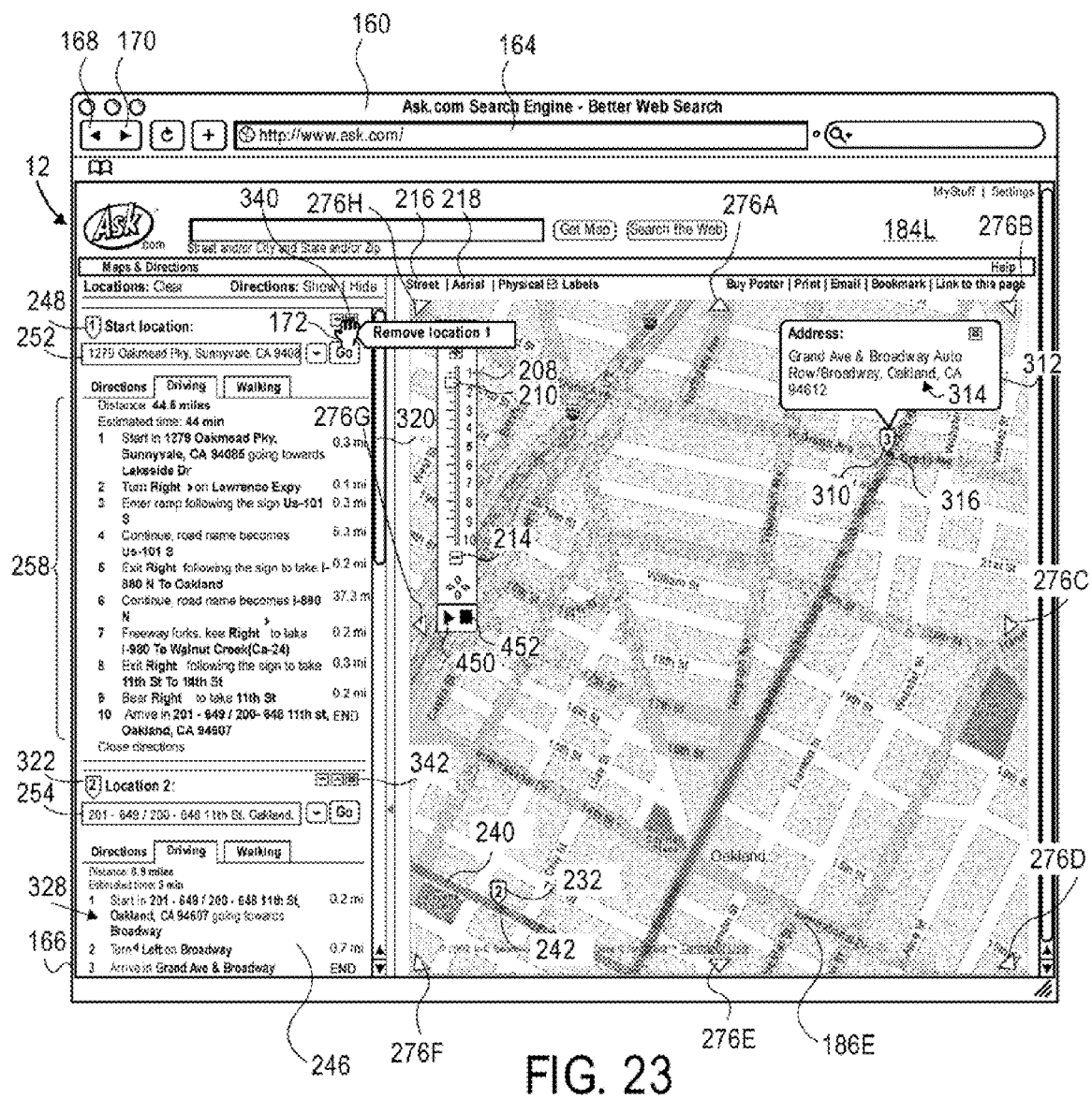
FIG. 23 is a view of the user interface illustrating the use of a deletion selector to remove a location.

FIG. 23 illustrates the view 184L of FIG. 21, but with the scroll bar 320 moved upwardly so that the pane 246 is moved down and the start location heading 248 is in view. A deletion selector 340 is located next to the start location heading 248. A similar deletion selector 342 is located next to the intermediate location heading 322 and, as shown in FIG. 21, a deletion selector 344 is also located next to the end location heading 324.

Figure 24:
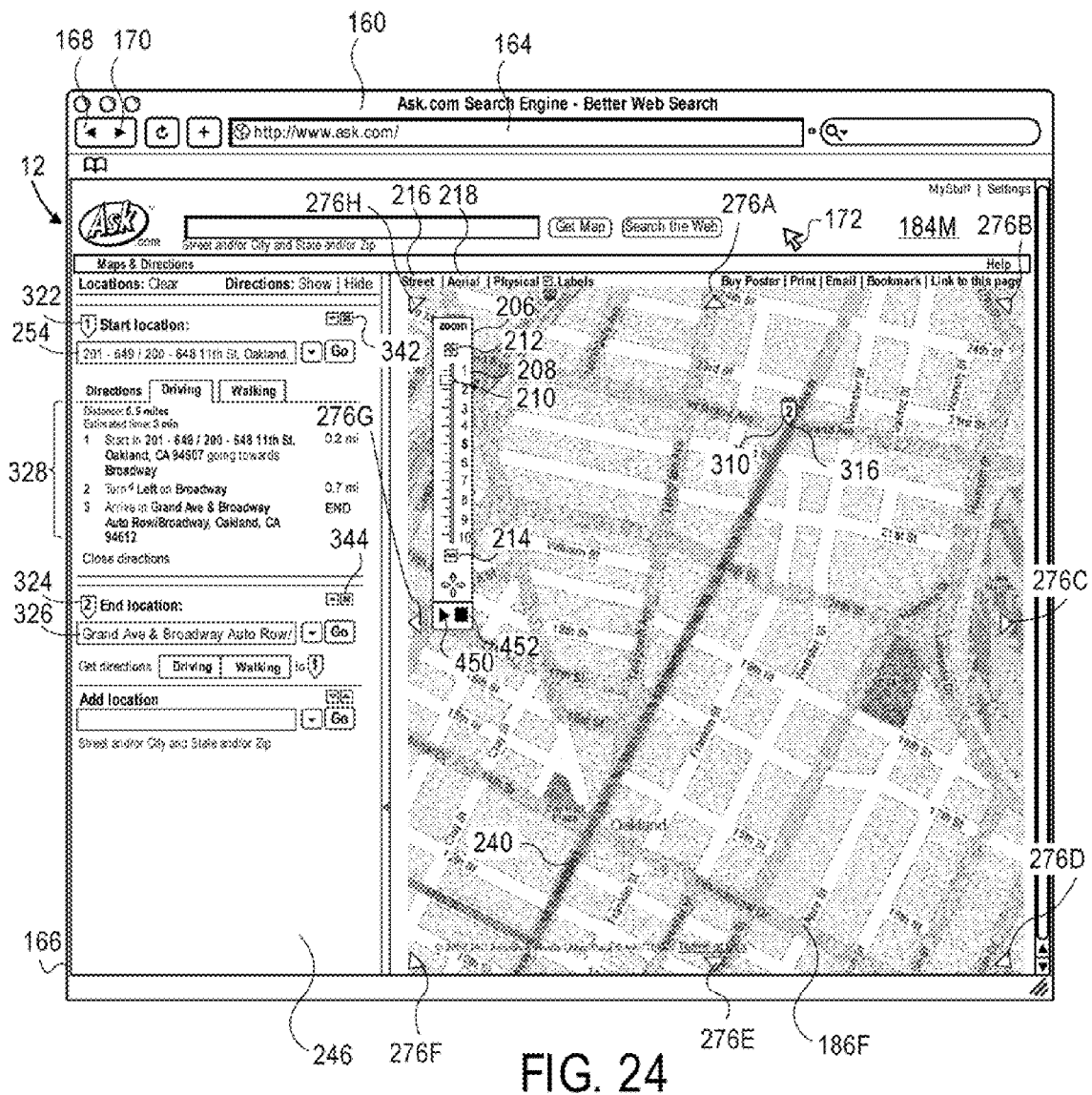
FIG. 24 is a view of the user interface after one location has been removed.

FIG. 24 is a view 184M of the user interface 12 that is generated in response to selection of the deletion selector 340 in the view 184L of FIG. 23. The start location heading 248 and the driving directions 258 of the view 184L in FIG. 23 are removed in the view 184M of FIG. 24. The intermediate location heading 322 is now a new start location heading and the driving directions 328 are between the start location heading 322 and the end location heading 324. A new map 186F is also provided in the view 184M of FIG. 24.

Figure 25:
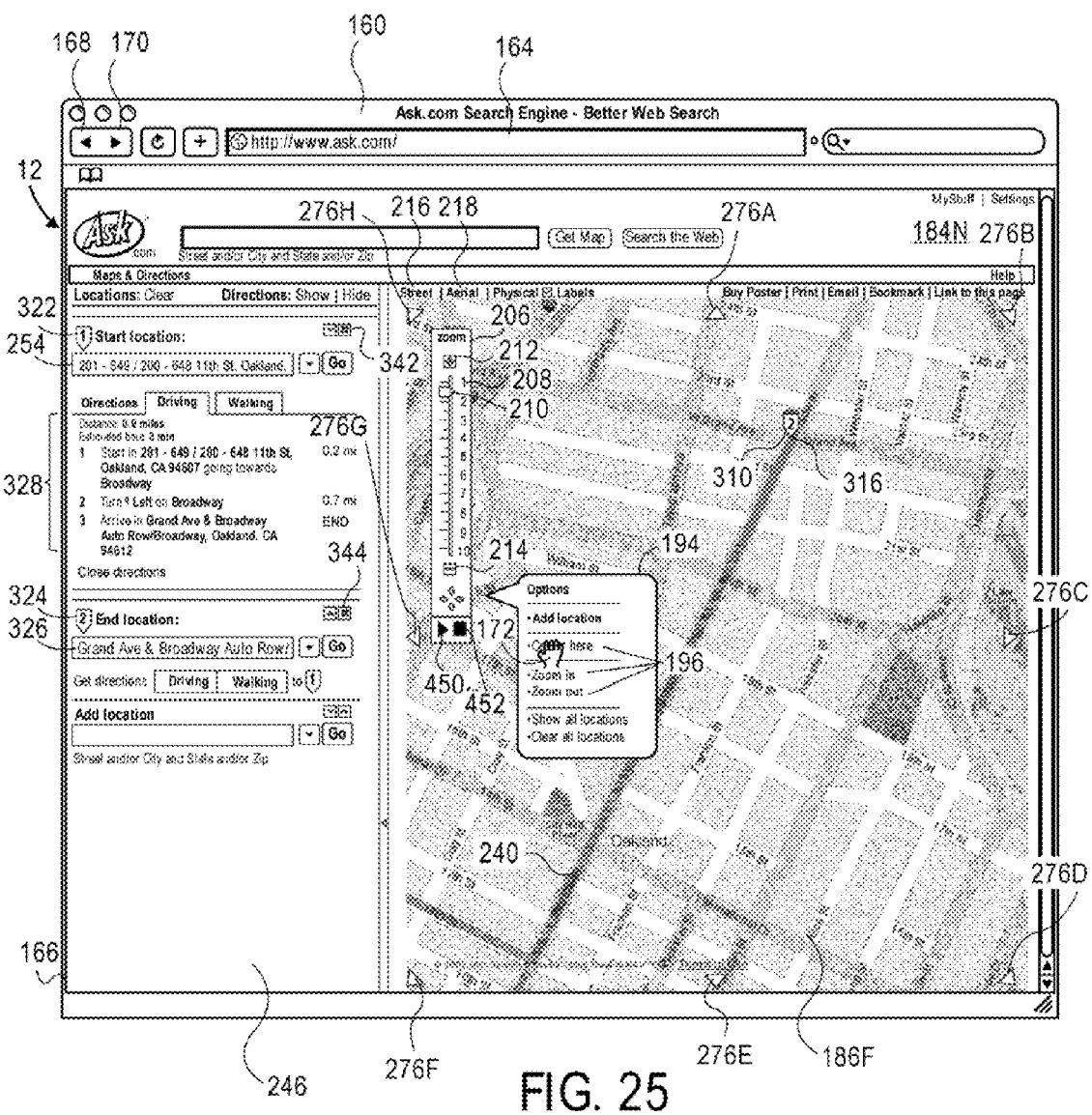
FIG. 25 is a view of the user interface illustrating the use of a selection window to center a map.

In the view 184N of FIG. 25, the user has selected a target location on the left of the map 186F by locating the cursor 172 at the target location and then depressing the right button on the mouse, which opens a selection window 194 with a plurality of alternatives 196. The user then selects the alternative 196 "Center here."

Figure 26:
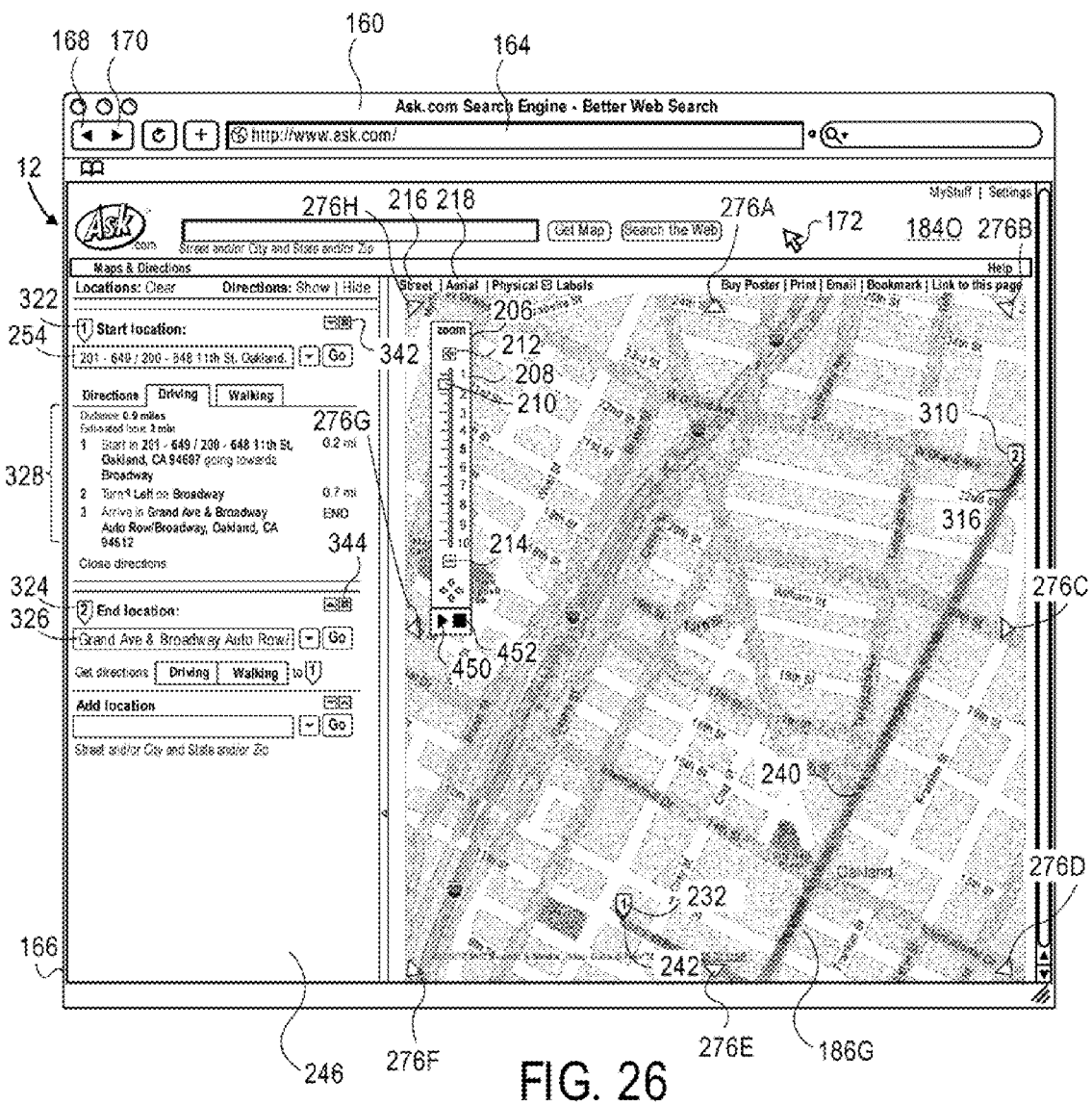
FIG. 26 is a view of the user interface after the map has been centered at a location selected by a user in the view of FIG. 25.

FIG. 26 is a view 184O of the user interface 12 that is generated upon selection of the "Center here" alternative 196 in the view 184N of FIG. 25. The view 184O includes a map 186G with a center point at the location selected by the user in the view 184N of FIG. 25. The start location 188 shown in FIG. 5 is thus not included in the path 240 anymore. Even if the map 186G should be zoomed out to include the start location 188, it would be evident that the path 240 only extends from the new start location 242 to the new end location 316.

Figure 27:
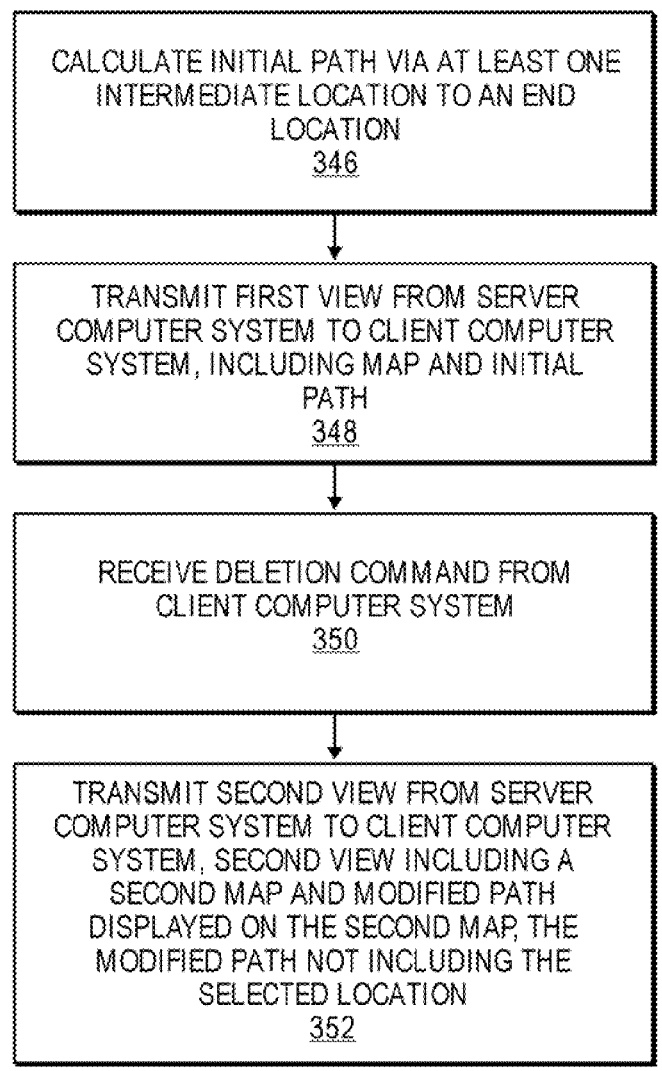
FIG. 27 is a flowchart illustrating how a location is deleted and what happens when the location is deleted.

FIG. 27 illustrates how the server computer system 16 in FIG. 1 interfaces with the client computer system 18 to generate the views 184L of FIG. 23 and 184O of FIG. 27. Details of how the map is centered using the selection window 94 in FIG. 25 are not shown in FIG. 27 because these details are the same as the centering details as the described with reference to FIG. 8.

At step 346, an initial path is calculated via at least one intermediate location to an end location. The initial path is the path 192 shown in the view 184A of FIG. 5 with the start location 188. At step 348, a first view, i.e. the view 184A of FIG. 5, is transmitted from the server computer system 16 to the client computer system 18, including the map 186A and the path 192. Upon selection of the deletion selector 340 in the view 184L of FIG. 23, a deletion command for the start location 188 is sent from client computer system 18 to the server computer system 16. At step 350, the deletion command is received from the client computer system 18 at the server computer system. At step 352, a second view, i.e. the view 184O of FIG. 26, is transmitted from the client computer system to the server computer system. The second view 184O includes a second map 186G and a modified path 240 on the second map 186G and the modified path 240 does not include the start location 188.

Although the start location 188 is deleted, when selecting the deletion selector 340 in the view 184L of FIG. 23, it may also be possible to delete the end location 316 by selecting the deletion selector 344 in FIG. 21. It may also be possible to delete the intermediate location 242 by selecting the deletion selector 342 in the view 184L of FIG. 21 or 23. Deletion of the end location 316 will modify the path 240 so that it extends only between the start location 188 and the intermediate location 242, which then becomes the end location. Deletion of the intermediate location 242 may result in a recalculated path that extends from the start location 188 to the end location 316 without passing through the intermediate location 242. The driving directions 258 and 328 will also be removed when the path is recalculated, and be replaced with new driving directions that are different from the driving directions 258 and 328.

It may also be possible to send a deletion command in response to a different action by a user. The user may, for example, select the location marker 232 by moving the cursor 172 over the location marker 232 and clicking the left button on the mouse, and then depressing a "Delete" key on the keyboard.

Figure 28:
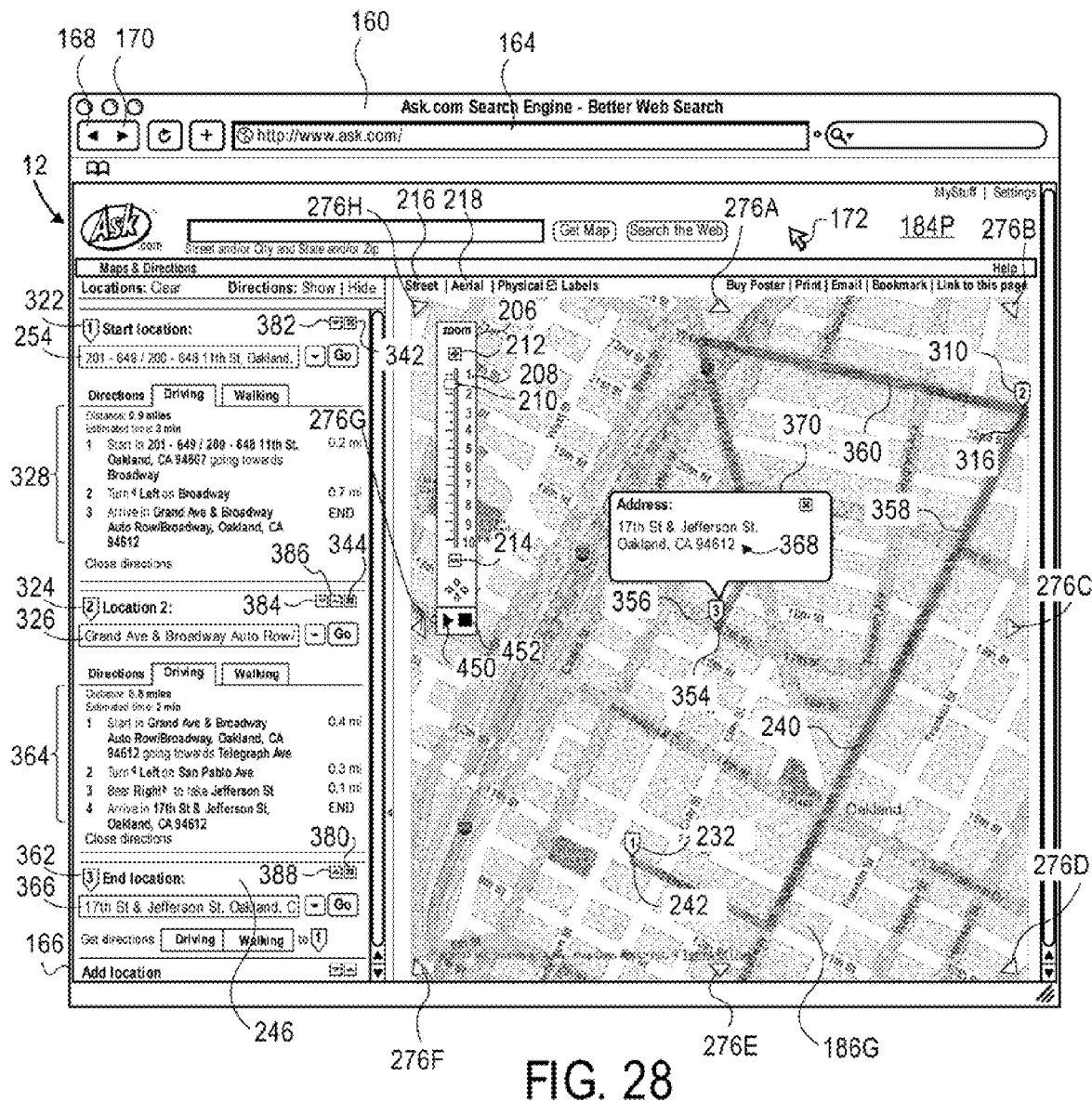
FIG. 28 is a view of the user interface after a location is added.

FIG. 28 is a further view 184P of the user interface 12, wherein an end location 354 and an end location marker 356 are placed on the map 186G also shown in the view 184O of FIG. 26. The end location 316 is now an intermediate location and the end location marker 310 is now an intermediate location marker. The path 240 is now extended from the intermediate location 316 to the end location 354. The path 240 thus has a first section 358, which is the entire path 240 in the view 184O of FIG. 26, and a second section 360 from the intermediate location 316 to the end location 354.

The end location heading 324 in the view 184O of FIG. 26 is an intermediate location heading 324 in the view 184P of FIG. 28. A new end location heading 362 is now located below the intermediate location heading 324 and driving directions 364 are calculated and displayed between the intermediate location heading 324 and the end location heading 362. The end location search box 326 is now an intermediate location search box holding the same address as in the view 184O of FIG. 26. A new end location search box 366 is provided at the end location heading 362 and holds an address that is the same as an address 368 in a target address area window 370 at the end location marker 356.

Any one of the markers 232, 310 and/or 356 can be "dragged" to and "dropped" at another location, with a corresponding modification in the path 240 of the driving directions 328 and/or 364. In one example, the end location marker 356 is dragged from an intersection of Seventeenth Street and Jefferson Street on one side of the first section 358 of the path 240 to Franklin Street on an opposite side of the first section 358.

Figure 29:
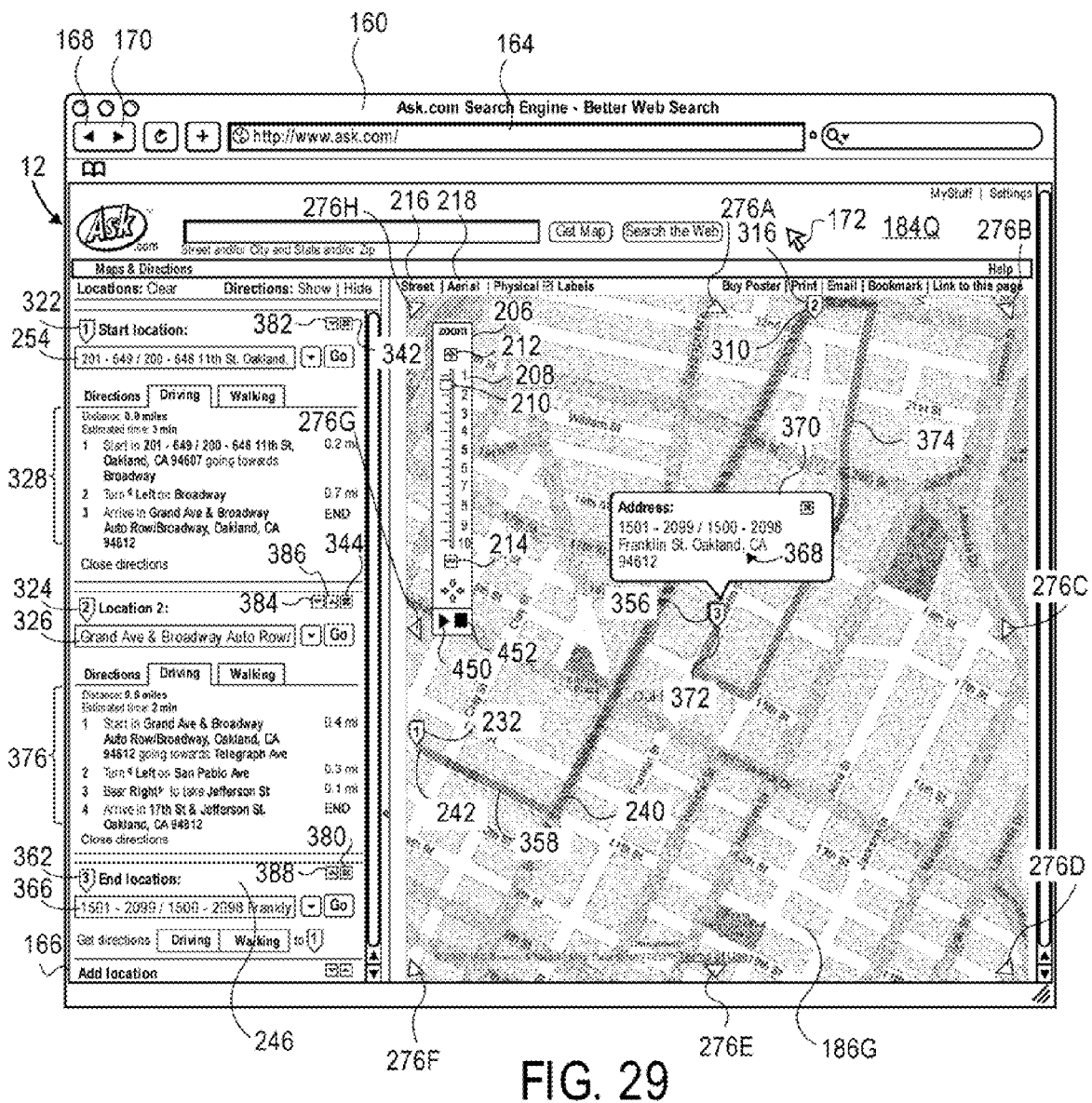
FIG. 29 is a view of the user interface after a location marker is moved from one location to another location.

FIG. 29 is a view 184Q of the user interface 12 after the end location marker 356 has been moved to a new end location 372 on Franklin Street. The path 240 still has the first section 358, but the second section 360 in the view 184P of FIG. 28 has been removed and has been replaced with a new second section 374 from the intermediate location 316 to the end location 372. An address for the end location 372 is automatically entered in the end location search box 366. The driving directions 364 for following the second section 360 in the view of 184P have been replaced in the view 184Q with new driving directions 376 for following the second section 374 of the path 240. The driving directions 328 for following the first section 358 of the path 240 have remained unchanged from the view 184P of FIG. 28 to the view 184Q of FIG. 29.

In addition to the deletion mark selectors 342 and 344, a deletion selector 380 is also located next to the end location heading 362. Delaying reordering selectors 382 and 384 are also located at the start and intermediate location headings 322 and 324 respectively. Advancing reordering selectors 386 and 388 are located next to the intermediate and end location headings 324 and 362, respectively.

Figure 30:
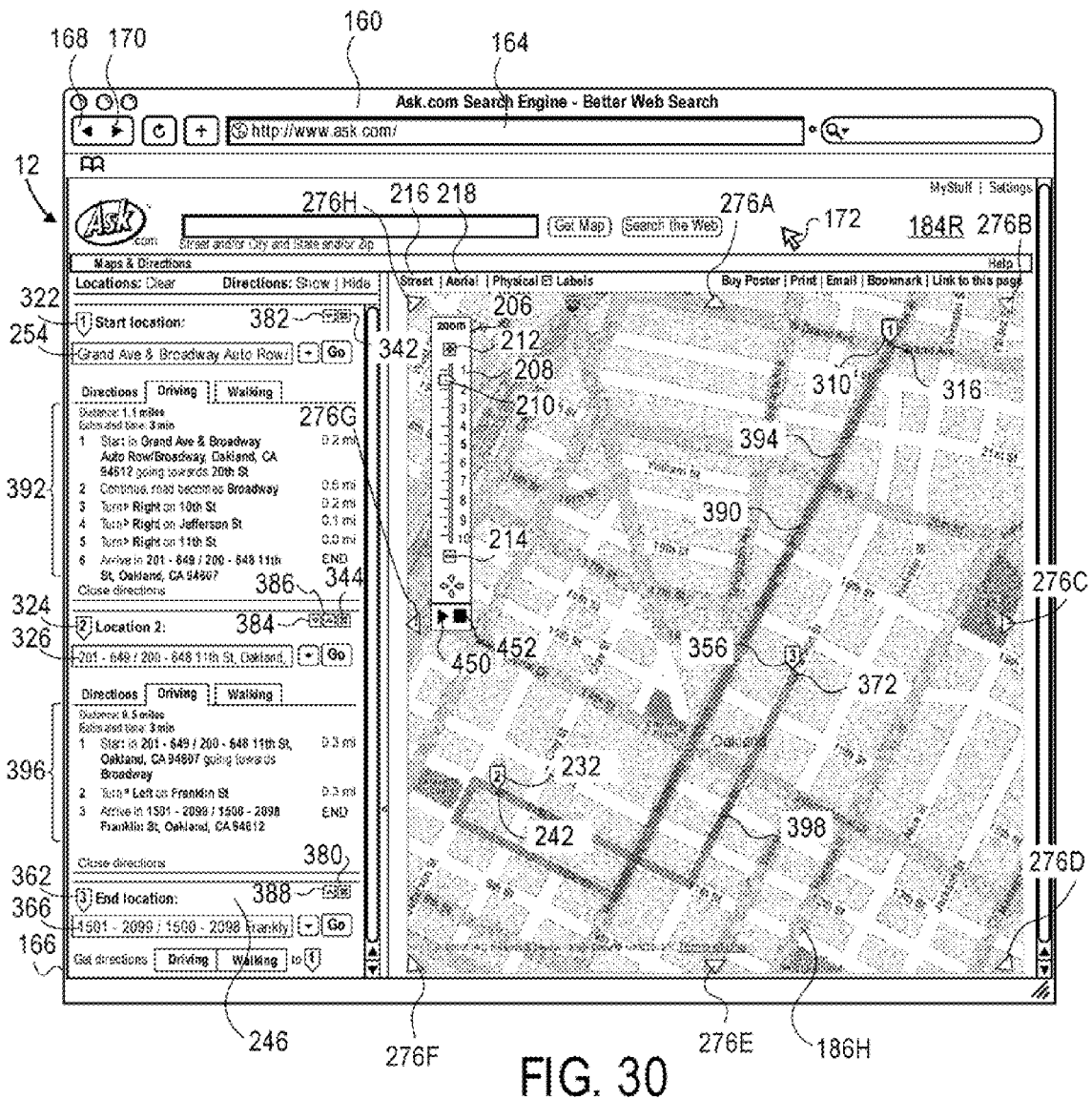
FIG. 30 is a view of the user interface after locations forming a path are reordered by moving one location later in the sequence of the path.

FIG. 30 shows a further view 184R of the user interface 12 with a map 186H that is almost the same as the map 186G of the view 184Q of FIG. 29. The view 184R is generated after a user selects the delaying reordering selector 382 in the view 184Q of FIG. 29. The path 240 of the view 184Q of FIG. 29 is replaced with a new path 390 on the map 186H of the view 184R of FIG. 30. The start location 242 and the end location 316 in the view 184Q in FIG. 29 are now intermediate and end start locations 242 and 316, respectively. The path 390 is thus sequentially from the start location 316 via the intermediate location 242 to the end location 372. The intermediate location marker 310 is a start location marker in the view 184R of FIG. 30 and the start location marker 232 is an intermediate location marker in the view 184R of FIG. 30.

The addresses for the start location 316, intermediate location 242 and the end location 372 are entered into the start location, intermediate location and end location search boxes 254, 326 and 366 respectively. New driving directions 392 for following a first section 394 of the path 390 from the start location 316 to the intermediate location 242 are included in the view 184R of FIG. 30 and replace the driving directions 328 in the view 184Q of FIG. 29. New driving directions 396 for following a second section 398 of the path 390 from the intermediate location 242 to the end location 372 are included in the view 184R of FIG. 30 between the intermediate location heading 324 and the end location heading 362, and thus replace the driving directions 376 in the view 184Q of FIG. 29.

Figure 31:
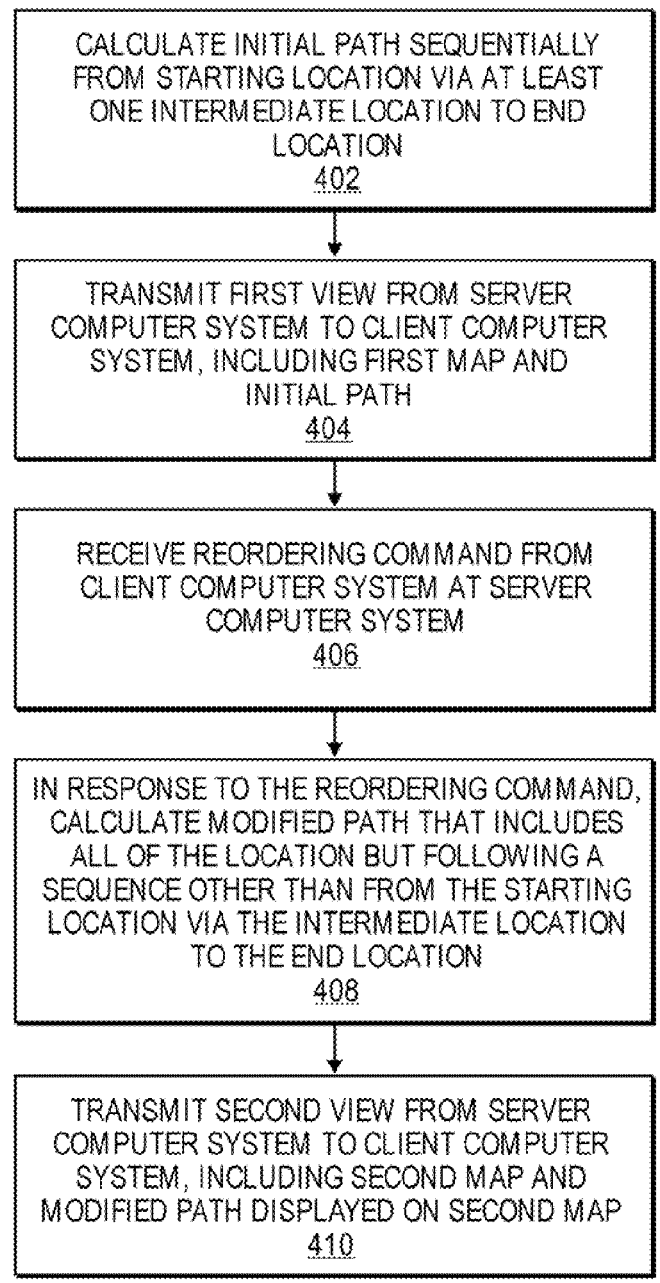
FIG. 31 is a flowchart illustrating how the locations are reordered and what happens upon reordering of the locations.

FIG. 31 illustrates interaction of the server computer system 16 in FIG. 1 with the client computer system 18 for generating the views 184Q and 184R of FIGS. 29 and 30. In the foregoing description, the labels of various components were interchanged in accordance with the altering of the sequence of the locations 242, 316 and 372. For purposes of consistency, the labels "start", "intermediate" and "end" of the view 184Q are used in the discussion of FIG. 31.

At step 402, the server calculates the initial path 240 sequentially from the starting location 242 via at least one immediate location 316 to the end location 372. At step 404, the server computer system 16 transmits a first view, i.e. the view 184Q, from the server computer system 16 to the client computer system 18, including a first map, i.e. the map 186G, to the initial path 240. Upon selection of the delaying reordering selector 382 by a user, a reordering command is transmitted from the client computer system 18 to the server computer system. At step 406, the reordering command is received from the client computer system 18 at the server computer system. At step 408, and in response to the reordering command, the server computer system 16 calculates a modified path, i.e. the path 390 of the view 184R in FIG. 30, that includes all of the locations 242, 316 and 372, but following a sequence other than from the starting location 242, the intermediate location 316 to the end location 372 (in the view 184Q of FIG. 29). At step 410, the server computer system 16 transmits a second view, i.e. the view 184R, from the server computer system 16 to the client computer system 18, including a second map, i.e. the map 184H, and the modified path 390 displayed on the second map 186H.

Figure 32:
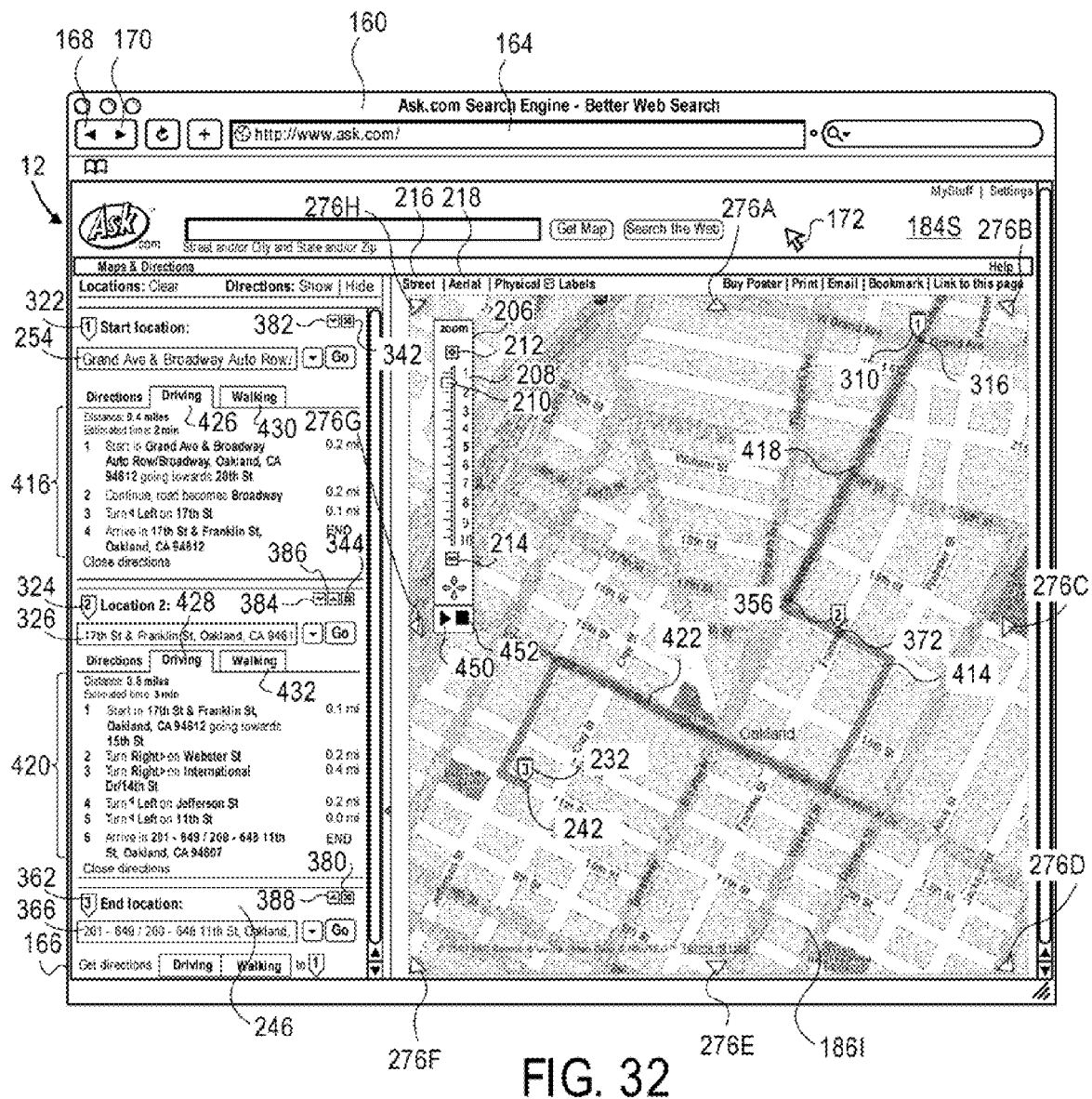
FIG. 32 is a view of the user interface after the locations are reordered by moving an end location to a position earlier in the path.

FIG. 32 illustrates a further view 184S of the user interface 12 that is generated after the user selects the advancing reordering selector 388 in the view 184R of FIG. 30. The locations 316, 372 and 242 are now start, intermediate and end locations of a newly calculated and therefore newly modified path 414. The markers 310, 356 and 232 are start, intermediate and end location markers respectively. The addresses in the location search boxes 326 and 366 are swapped. New driving directions 416 are included in the view 184S of FIG. 32 and replace the driving directions 392 in the view 184R of FIG. 30. The driving directions 416 are from one intersection to the next to follow a first section 418 of the path 414 from the start location 316 to the intermediate location 372. New driving directions 424 following a second section 422 of the path 414 from the intermediate location 372 to the end location 242 are also included in the view 184S of FIG. 32 and replace the driving directions 396 in the view 184 of FIG. 30.

Selection of the delaying reordering selector 382 thus moves a location (e.g., the location 242 in the view 184Q of FIG. 29) to a position later in a path. The delaying reordering selector 384 can be used in a similar manner to move a location (e.g., the location 316 in the view 184Q of FIG. 29) to a position later in a path. The advancing reordering selectors 386 and 388 can be used to move a location to a position earlier in a path. Selection of a respective reordering selector 382, 384, 386 or 388 results in transmission of a reordering selection command from the client computer system 18 in FIG. 1 to the server computer system 16. The reordering selection commands are different from one another and the server computer system 16 responds differently to the different reordering selection commands.

The location markers 310, 332 and 356 can also be reordered by dragging and dropping the headings 322, 324 and 362. For example, the heading 362 can be selected, dragged and dropped to a location above the heading 322. Should this for example be done in the view of 184Q of FIG. 29, the end location 372 would become the start location, the intermediate location 310 would become the end location, and the start location 242 would become the intermediate location. The end location 372 is thus moved forward past two locations, namely the locations 310 and 242, for purposes of calculating another path.

All the streets with their names appearing on the map 186I have their names stored in a database at the server computer system 16 of FIG. 1. Each street that is a one way street is also flagged with the direction of flow. Franklin Street, for example, is flagged as a one way street going north. Broadway is either not flagged or is flagged as a street going both north and south. Without directional flagging of the streets, the server computer system 16 may determine that the shortest path from the start location 316 to the intermediate location 372 is south on Franklin Street. However, the server computer system 16 ignores any one way streets going north when calculating a driving path from the start location 316 to the intermediate location 372. The server computer system 16 accordingly, calculates the first section 418 of the path 414 to be down Broadway, which is a bidirectional street, and not down Franklin Street, which is a one way street going north.

Also included in the pane 246 are different transportation mode selectors, including two driving selectors 426 and 428 and two walking selectors 430 and 432. The driving and walking selectors 426 and 430 are positioned next to one another between the start location search box 254 and the start driving directions 416. Similarly, the driving and walking selectors 428 and 432 are located next to one another between the intermediate location search box 326 and the end driving directions 420. When mousing over the driving selectors 426 and 428, the cursor 172 has an arrow shape, indicating that the driving selectors 426 and 428 are not active or selectable. When mousing over the walking selectors 430 and 432, the cursor 172 changes to a hand shape, indicating that the walking selectors 430 and 432 are active and can be selected.

Figure 33:
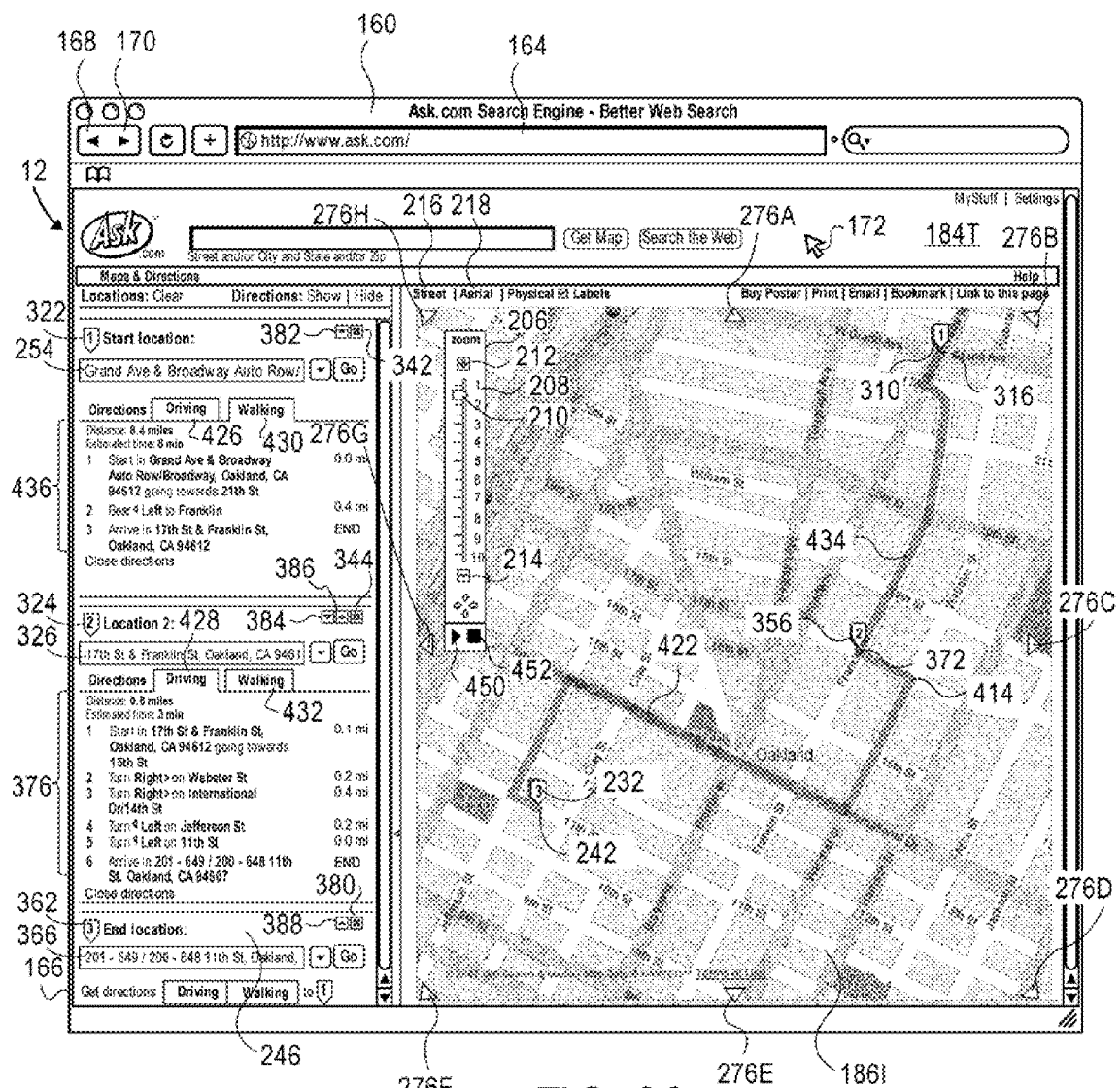
FIG. 33 is a view of the user interface after a driving path and directions are replaced with a walking path and directions.

FIG. 33 is a further view 184T of the user interface 12 which is generated upon selection of the walking selector 430 in the view 184S of FIG. 32. The view 184T of FIG. 33 includes the same map 184I of the view 184S in FIG. 32. The first section 418 of the path 414 in the view 184S of FIG. 32 is removed and replaced with a new first section 434 from the start location 316 to the intermediate location 372. The server computer system 16 in FIG. 1 has calculated the first section 434 ignoring that Franklin Street is flagged as a one way street going north. The section 434 thus includes Franklin Street.

The walking selector 430 is not active and the cursor 172 has an arrow shape when mousing over the walking selector 430 in the view 184T of FIG. 33. The driving selector 426 is active and selection thereof returns the user interface 12 to the view 184S of FIG. 32. Alternatively, the user can select the walking selector 432 so that a path is displayed from the intermediate location 372 to the end location 242 ignoring one way streets. Such a path would not bypass Franklin Street, as is the case with the section 422 in the views 184S and 184T of FIGS. 32 and 33.

Any walking path may go against a direction of a one way street. However, any driving path will never go against the direction of any one way street. For example, the first section 434 goes against the one way direction of Franklin Street, but also has a portion that is on Broadway, Broadway being a bidirectional street. However, the entire second section 422 never goes against the direction of any one way street.

The street sections are also flagged in a database that holds the street section data in a hierarchy that includes highways and surface roads with each street having a different hierarchy. Highways are avoided when calculating walking directions and are preferred when calculating driving directions.

Walking directions 436 for following the first section 434 from the start location 316 to the intermediate location 372 are also included in the view 184T of FIG. 33. The walking directions 436 are in approximately the same location and replace the driving directions 416 of the view 184S of FIG. 32.

Figure 34:
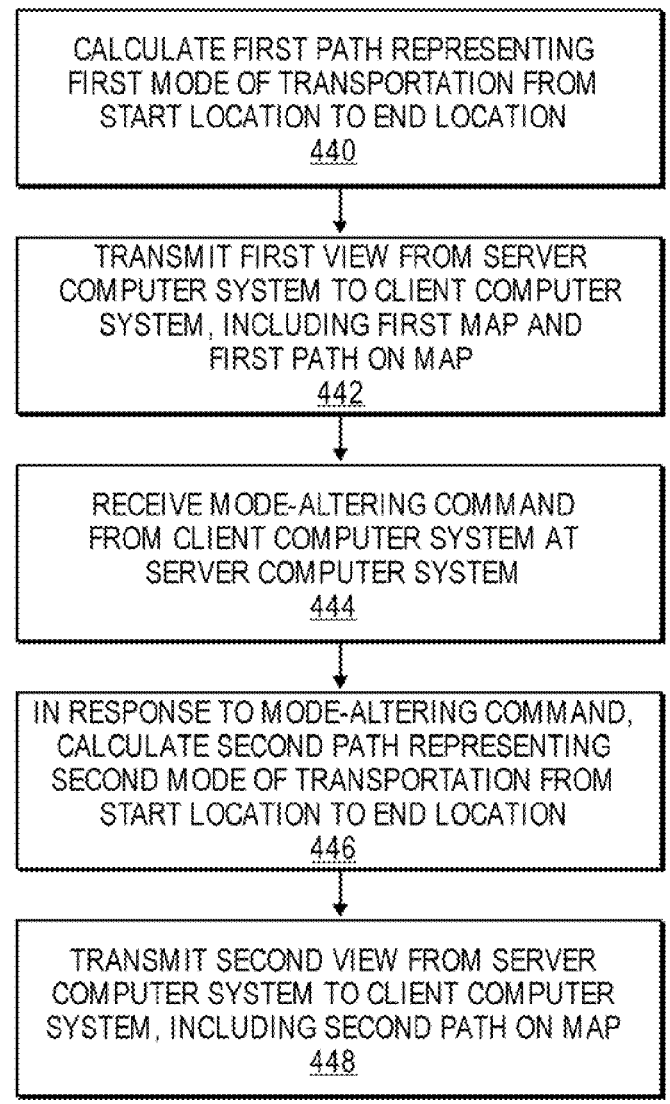
FIG. 34 is a flowchart illustrating how the driving path and directions are replaced with the walking path and directions.

FIG. 34 illustrates interaction or interfacing of the server computer system 16 with the client computer system 18 to render the views 184S and 184T of FIGS. 32 and 33. In step 440, the server computer system 16 calculates a first path, e.g. the section 418, representing a first mode of transportation, in the present example driving, from a start location to an end location, for purposes of discussion of FIG. 34 alone the locations 316 and 372. The server computer system 16 then transmits a first view, i.e. the view 184S to the client computer system 18, with the section 418 on the map 186I. A mode altering command is transmitted from the client computer system 18 to the server computer system 16 when a user selects the walking selector 430. At step 440, the mode altering command is received from the client computer system 18 at the server computer system 16. At step 440, and in response to the mode altering command, the server calculates a second path, in the present example the first section 434 of the view 184T of FIG. 33, representing a second mode of transportation, in the present example walking, from the start location to the end location, in the present example the locations 316 and 372. In step 448, the server computer system 16 transmits a second view, i.e. the view 184T, to the client computer system 18, including the second path, i.e. the first section 434, on the map 184I. Separate mode altering commands are associated with the other mode altering selectors 426, 428 and 432.

As further illustrated in the view 184T of FIG. 33, play and stop selectors 450 and 452 are provided below the scale 208. Parts of the user interface 12 are in JavaScript™ which is executable at the client computer system 18 in FIG. 1. Java-Script™ for example opens the selection window 194 in FIG. 6, allows for dragging of the end location marker 232 in FIG. 12, allows for movement of the map 186E in FIGS. 15 though 18 without having to replace the entire map 186E, etc. Java-Script™ also allows for execution of a series of instructions at the client computer system 18 in FIG. 1, as now described with reference to FIGS. 33, 35 and 36.

Figure 35:
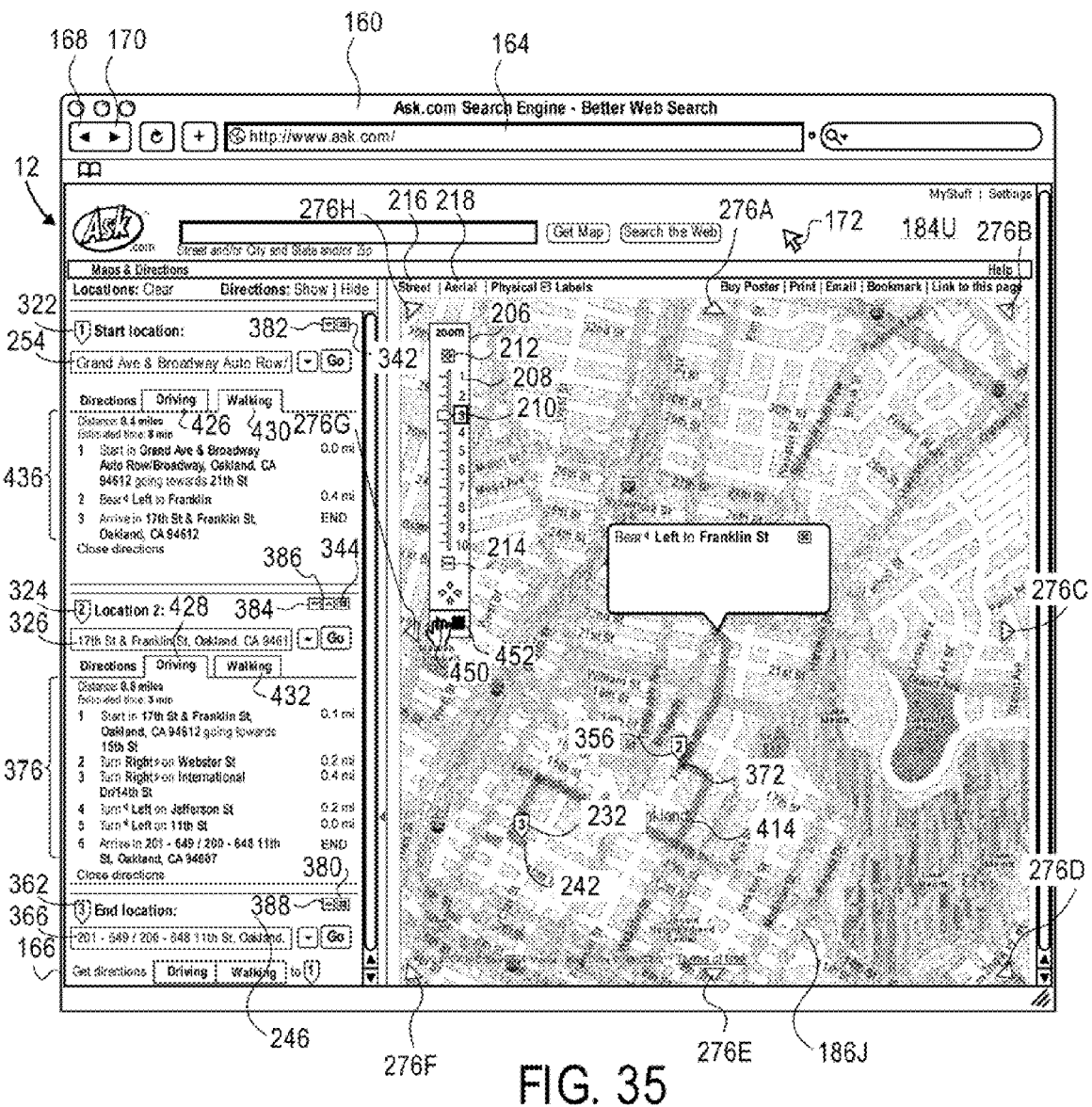
FIGS. 35 and 36 are views of the user interface illustrating the use of a play selector to sequentially indicate direction steps at subsequent locations of a path and automatically at equally spaced intervals of time.
Figure 36:
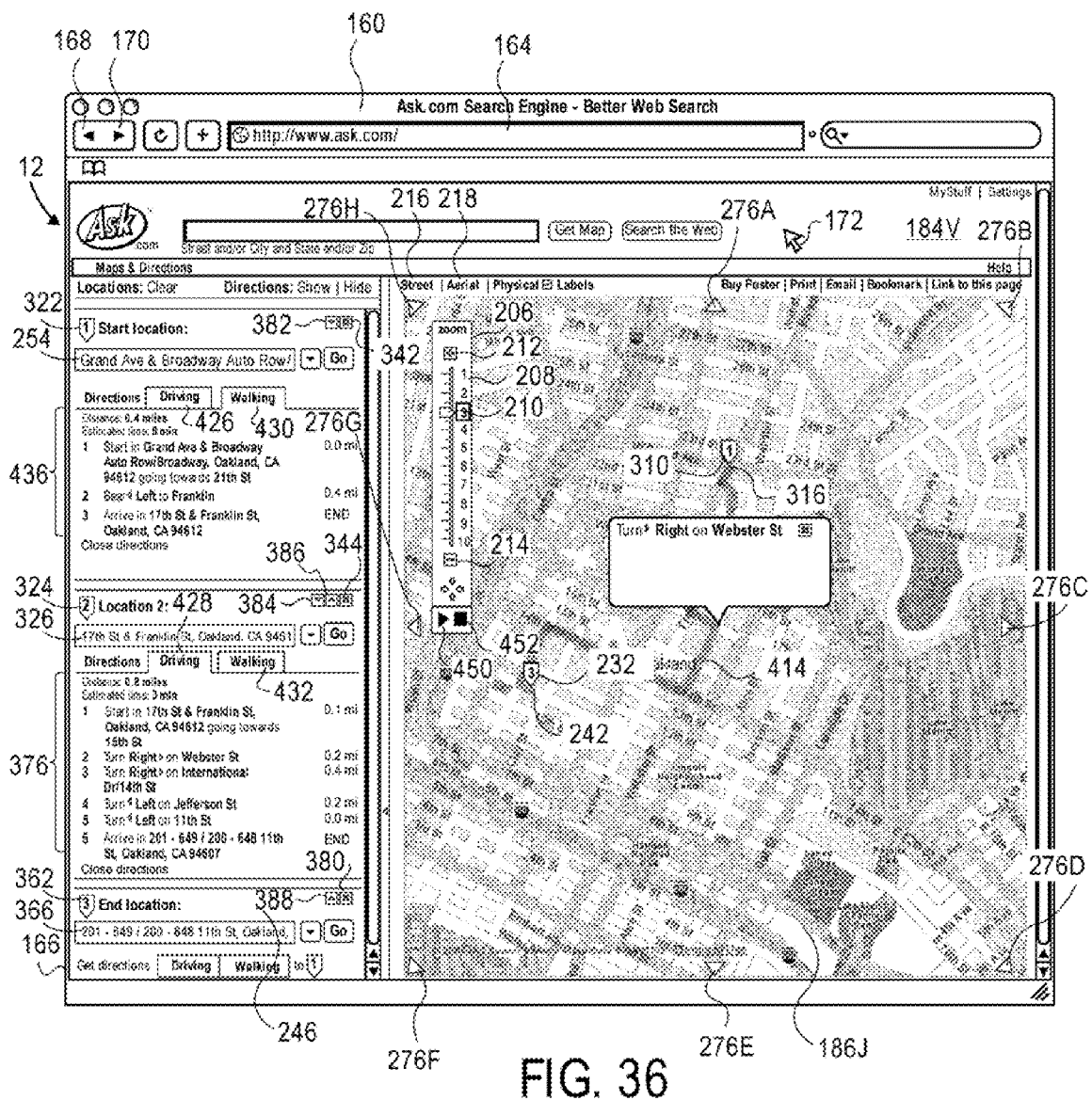

A user first selects the play button 450 in the view 184T of FIG. 33. Due to selection of the play button 450, a view 184U, as illustrated in FIG. 35, is generated, followed by a view 184V as illustrated in FIG. 36. The views 184U and 184V of FIGS. 35 and 36 each have a direction window 454 at a respective intersection of the path 414. The direction step 456 in the direction window 454 in the view 184U of FIG. 35, is the same direction step as the direction step numbered "2" under the walking directions 436. The direction step 456 in the direction window 454 of the view 184V of FIG. 36 is the same direction step as the direction step numbered "2" of the driving directions 420.

The views 184U and 184V are only two views in series of nine views that appear at equally spaced intervals of time of at least three seconds, typically two to five seconds. Each one of the views has a respective direction window and a respective one of the direction steps of the walking directions 436 and 420. The direction windows in the series of nine views are sequentially at successive intersections of the path 414 and the directions in the direction windows are successively the direction steps of the walking directions 436 and 420. A user can at any time select the stop selector 452 to stop sequential display of the nine views.

The series of nine views allows a user to grasp successive steps of the walking directions 436 and 420 in conveniently spaced time intervals. The series of nine views also illustrate successive steps of the walking directions 436 and 420 directly at intersections of the path 414 on the map 186J.

It should be evident to one skilled of the art that the sequence that has been described with reference to the foregoing drawings may be modified. For example, an aerial photograph, such as the aerial photograph 222 shown in FIG. 12, can be displayed in any one of the views of the user interface 12. It may also be possible to move start location and intermediate location markers instead of or in addition to movement of end location markers as described with reference to FIGS. 12 and 29. Frequent use is made in the description and the claims to a "first" view and a "second" view. It should be understood that the first and second views may be constructed from the exact same software code and may therefore be the exact same view at first and second moments in time. "Transmission" of a view should not be limited to transmission of all the features of a view. In some examples, an entire view may be transmitted and be replaced. In other examples, JavaScript™ may be used to update a view without any client-server interaction, or may be used to only partially update a view with client-server interaction.

Figure 37:
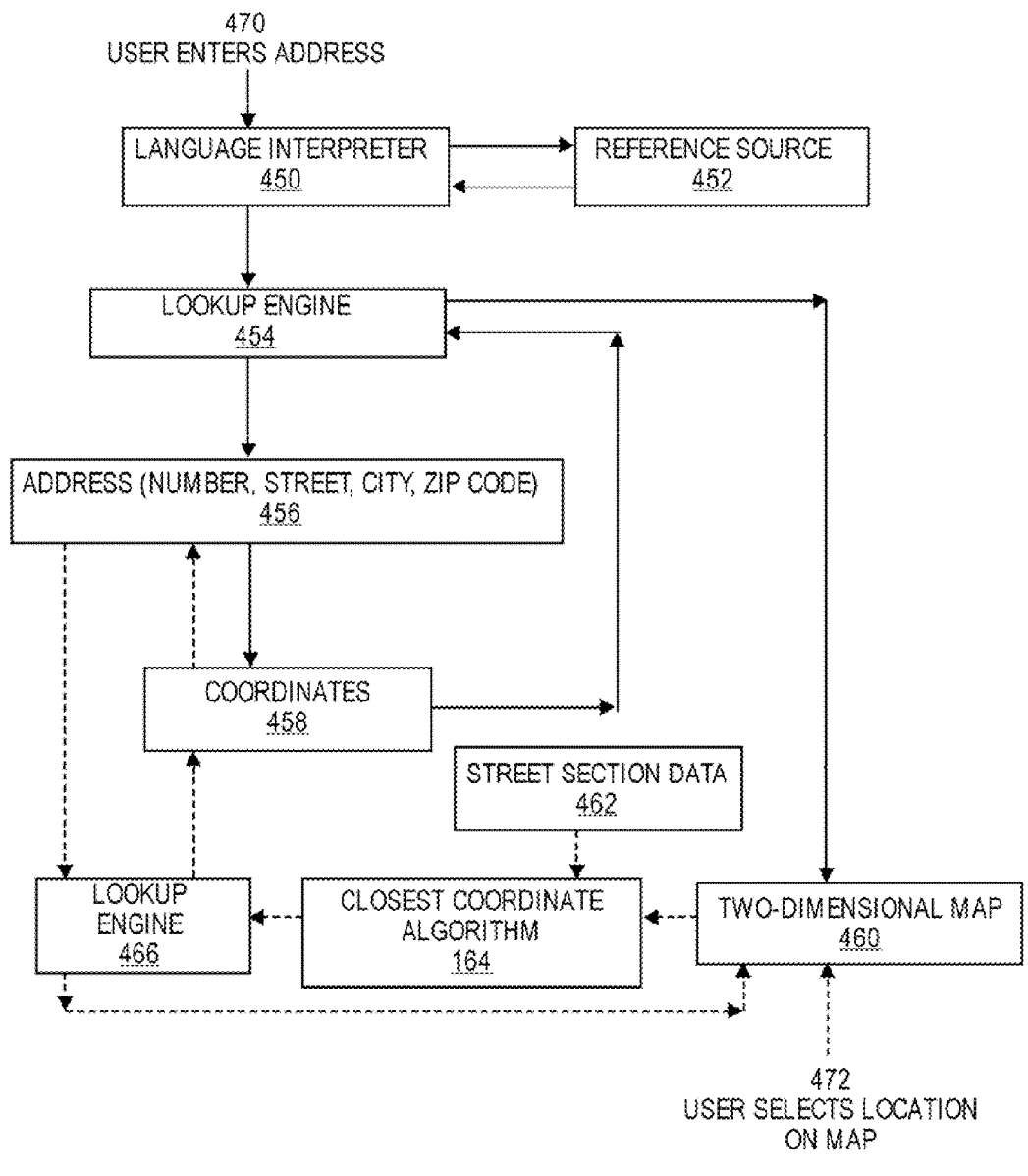
FIG. 37 is a block diagram of components of the server computer system forming part of the network environment of FIG. 1, specifically illustrating a forward look-up of coordinates corresponding to an address and a reverse look-up of an address when coordinates are known.

FIG. 37 illustrates components of the server system 16 of FIG. 1, including a language interpreter 450, reference sources 452, a look-up engine 454, a database or datasource that relates addresses (number, street, city, zip code) and coordinates 458 (longitude and latitude) to one another, one or more two-dimensional maps 460, street section data 462, a closest coordinate algorithm 464, and another look-up engine 466. The two dimensional map 460 may be located at one of the structured databases 26 in FIG. 1 located at a partner cite. Similarly, the data that relates the addresses 456 and the coordinates 458 may be located on one of the structured databases 26 or another reference source located on another partner cite.

Solid lines in FIG. 37 represent a forward look-up and mapping of an address or addresses as illustrated with reference to FIGS. 4 and 5. At 470 a user enters an address. The language interpreter 450 utilizes the reference source 452 to interpret the address entered by the user at 470. For example, the language interpreter may use the reference source 452 to conduct a spelling check for words in the address entered by the user at 470. A spelling check can be carried out on words that are not names and words that are names. The result of the language interpreter 450 is provided to the look-up engine 454. The look-up engine 454 is typically one or more lines of code that includes the language interpreter 450. The look-up engine 454 submits the address provided by the language interpreter 450 to the reference source that includes the addresses 454 and the related coordinates 458. The address provided by the look-up engine 454 is compared to the addresses 456 or "looked-up" among the addresses 454. Once the respective address of the addresses 456 corresponding to the address provided by the look-up engine 454 is found, the related coordinate among the coordinates 458 corresponding to the selected one of the addresses 456 is extracted and provided to the look-up engine 454. The look-up engine 454 then places a location marker at the extracted coordinates on the two-dimensional map 460.

Dashed lines in FIG. 37 represent a reverse look-up of an address as represented in FIGS. 12 and 13. At 472, the user selects a location on the two-dimensional map 460, as discussed with reference to FIG. 12 where the user selects a location 232 on the street map 186C. The street section data 462 includes data of coordinates and directions of streets. The closest coordinate algorithm 464 utilizes the coordinates that the user enters at 472 and the street section data 462 to mathematically find a street section closest to the location provided by the user at 472. The street section is shown as 11$^{th}$ street in the target address window 232 in the view 184G of FIG. 13. The closest coordinate algorithm 464 subsequently finds the coordinates of intersections of the street, in the present example 11$^{th}$ street, with the closest streets in both directions. It could be noted that, although the target address window 232 includes the numbers and the name of the street, this data is still unavailable and only the coordinates of the street and the intersections have been calculated.

The look-up engine 466 then enters the coordinates of the street and the intersections into the data that relates the addresses 456 to the coordinates 458. Every one of the addresses 456 has a single one of the coordinates 458 associated therewith. Every one of the coordinates 458 has a single one of the addresses 456 associated therewith. Every one of the addresses provided by the look-up engine 454 can be found among the addresses 456. However, not every coordinate can be found among the coordinates 458. The coordinates of every intersection, however, can be found among the coordinates 458. The look-up engine 466 thus provides coordinate data that can be found among the coordinates 458.

Once the respective coordinates are found among the coordinates 458, the associated address 456 is extracted among the addresses 456. In the present example, the extracted addresses are 201-649 on one side of 11$^{th}$ Street and 200-648 on an opposite side of 11$^{th}$ Street. The extracted addresses are provided to the look-up engine 466 and the look-up engine 466 places the address on the two-dimensional map 460. In the present example, the address 238 is shown in the target address window 234 in the view 184G of FIG. 13.

While certain exemplary embodiments have been described and shown in the accompanying drawings, it is to be understood that such embodiments are merely illustrative and not restrictive of the current invention, and that this invention is not restricted to the specific constructions and arrangements shown and described since modifications may occur to those ordinarily skilled in the art.

What is claimed:

1. A user interface, comprising:
at least one computer generated map;
an initial path displayed on the at least one map, the initial path being from a starting location via at least one intermediate location to an end location;
a deletion selector corresponding to a selected one of the locations;
a modified path displayed on the at least one map, the modified path including the starting and all the locations but not including the selected location due to the selection of the deletion selector.

2. The user interface of claim 1, further comprising:
at least one view transmitted from a server computer system to a client computer system, the at least one view including the data entry field, the at least one map, the initial path, and the modified path.

3. The user interface of claim 2, wherein the at least one view includes the delete selector.

4. The user interface of claim 2, wherein the at least one view includes:
a first view and the map is a first map included in the first view; and
a second view that includes a second map with the modified path.

5. The user interface of claim 4, wherein the second view is generated in response to a deletion command that is transmitted upon selection of the deletion selector.

6. The user interface of claim 4, wherein the modified path is automatically calculated upon selection of the deletion selector.

7. The user interface of claim 4, wherein the second map is the same as the first map.

8. The user interface of claim 1, wherein the selected location is the end location.

9. The user interface of claim 1, wherein the selected location is the intermediate location.

10. The user interface of claim 1, further comprising:
a plurality of deletion selectors, each in association with a respective one of the locations.

11. The user interface of claim 10, further comprising:
initial driving directions to follow the initial path; and
modified driving directions to follow the modified path.

12. The user interface of claim 11, wherein the initial driving directions include a starting set of directions located between an address for the first location and an address for the intermediate location, and an ending set of directions located between the address for the intermediate location and an address for the end location.

13. The user interface of claim 1, further comprising:
a location marker at an initial one of the locations, the location marker being movable from the initial location to a target location on the map.

14. The user interface of claim 1, wherein the initial path is adjustable.

15. The user interface of claim 14, wherein the initial path is adjustable by moving the starting location on the map.

16. The user interface of claim 14, wherein the initial path is adjustable by moving the end location on the map.

17. The user interface of claim 14, wherein the initial path is adjustable by moving the intermediate location on the map.

18. The user interface of claim 1, further comprising:
an aerial selector, selection of the aerial selector adding an aerial photograph with the map over the aerial photograph.

19. The user interface of claim 1, wherein the map is a street map.

20. The user interface of claim 1, further comprising:
at least one data entry field for entering data relating to the locations.

21. A method of providing information, comprising:
calculating an initial path from a starting location via at least one intermediate location to an end locations;
displaying at least one map with the initial path displayed on the map;
receiving a deletion command indicative of removal of a selected one of the location;
calculating a first modified path including the starting location and all other locations but not including the selected location; and
displaying the first modified path on the at least one map.

22. The method of claim 21, further comprising:
transmitting at least one view from a server computer system to a client computer system, the at least one view including the data entry field, the at least one map, the initial path, and the modified path.

23. The method of claim 21, wherein the at least one view includes the delete selector.

24. The method of claim 21, further comprising:
transmitting a first view and the map is a first map included in the first view; and
transmitting a second view that includes a second map with the modified path.

25. The method of claim 24, wherein the second view is generated in response to a deletion command that is transmitted upon selection of the deletion selector.

26. The method of claim 24, wherein the modified path is automatically calculated upon selection of the deletion selector.

27. The method of claim 24, wherein the second map is the same as the first map.

28. The method of claim 21, wherein the selected location is the end location.

29. The method of claim 21, wherein the selected location is the intermediate location.

30. The method of claim 21, wherein a plurality of deletion selectors are associated with respective ones of the locations.

31. The method of claim 21, further comprising:
determining initial driving directions to follow the initial path, wherein the first view includes the initial driving directions; and
determining modified driving directions to follow the modified path, wherein the second view includes the modified driving directions.

32. The method of claim 31, wherein the initial driving directions include a starting set of directions located between an address for the starting location and an address for the intermediate location, and an ending set of directions located between the address for the intermediate location and an address for the end location.

33. The method of claim 21, wherein the first view includes a location marker at an initial one of the locations, the location marker being movable from the initial location to a target location on the map.

34. The method of claim 21, further comprising:
adjusting the initial path on the map.

35. The method of claim 34, wherein the initial path is adjustable by moving the starting location on the map.

36. The method of claim 34, wherein the initial path is adjustable by moving the end location on the map.

37. The method of claim 34, wherein the initial path is adjustable by moving the intermediate location on the map.

38. The method of claim 21, further comprising:
receiving a reordering command from the client computer system at the server computer system; and
in response to the reordering command, calculating a modified path that includes all of the locations but following a sequence other than from a starting location via the intermediate location to the selected location.

39. The method of claim 21, calculating a first path representing a first mode of transportation from a starting location to an end location;
transmitting a first view from a server computer system to the client computer system, the first view including a first map and the first path displayed on the map;
calculating a second path representing a second mode of transportation from the starting location to the end location, the second path being at least partially different from the first path; and
displaying the second path on the map.

40. The method of claim 21, further comprising:
receiving an aerial view command from the client computer system at the server computer system; and
in response to the aerial view command, displaying an aerial photograph below the map.

41. The method of claim 21, wherein the map is a street map.

42. A computer-readable medium having stored thereon a set of instructions that are executable by a processor to carry out a method of providing information, the method comprising:
calculating an initial path from a starting location via at least one intermediate location to an end locations;
displaying at least one map with the initial path displayed on the map;
receiving a deletion command indicative of removal of a selected one of the location;
calculating a first modified path including the starting location and all other locations but not including the selected location; and
displaying the first modified path on the at least one map.

43. The computer-readable medium of claim 42, the method further comprising:
transmitting at least one view from a server computer system to a client computer system, the at least one view including the data entry field, the at least one map, the initial path, and the modified path.

44. The computer-readable medium of claim 42, wherein the at least one view includes the delete selector.

45. The computer-readable medium of claim 42, the method further comprising:
transmitting a first view and the map is a first map included in the first view; and
transmitting a second view that includes a second map with the modified path.

46. The computer-readable medium of claim 45, wherein the second view is generated in response to a deletion command that is transmitted upon selection of the deletion selector.

47. The computer-readable medium of claim 45, wherein the modified path is automatically calculated upon selection of the deletion selector.

48. The computer-readable medium of claim 45, wherein the second map is the same as the first map.

49. The computer-readable medium of claim 42, wherein the selected location is the end location.

50. The computer-readable medium of claim 42, wherein the selected location is the intermediate location.

51. The computer-readable medium of claim 42, wherein a plurality of deletion selectors are associated with respective ones of the locations.

52. The computer-readable medium of claim 42, the method further comprising:
   determining initial driving directions to follow the initial path, wherein the first view includes the initial driving directions; and
   determining modified driving directions to follow the modified path, wherein the second view includes the modified driving directions.

53. The computer-readable medium of claim 52, wherein the initial driving directions include a starting set of directions located between an address for the starting location and an address for the intermediate location, and an ending set of directions located between the address for the intermediate location and an address for the end location.

54. The computer-readable medium of claim 42, wherein the first view includes a location marker at an initial one of the locations, the location marker being movable from the initial location to a target location on the map.

55. The computer-readable medium of claim 42, the method further comprising:
   adjusting the initial path on the map.

56. The computer-readable medium of claim 55, wherein the initial path is adjustable by moving the starting location on the map.

57. The computer-readable medium of claim 55, wherein the initial path is adjustable by moving the end location on the map.

58. The computer-readable medium of claim 55, wherein the initial path is adjustable by moving the intermediate location on the map.

59. The computer-readable medium of claim 42, the method further comprising:
   receiving a reordering command from the client computer system at the server computer system; and
   in response to the reordering command, calculating a modified path that includes all of the locations but following a sequence other than from a starting location via the intermediate location to the selected location.

60. The computer-readable medium of claim 42, calculating a first path representing a first mode of transportation from a starting location to an end location;
   transmitting a first view from a server computer system to the client computer system, the first view including a first map and the first path displayed on the map;
   calculating a second path representing a second mode of transportation from the starting location to the end location, the second path being at least partially different from the first path; and
   displaying the second path on the map.

61. The computer-readable medium of claim 42, the method further comprising:
   receiving an aerial view command from the client computer system at the server computer system; and
   in response to the aerial view command, displaying an aerial photograph below the map.

62. The computer-readable medium of claim 42, wherein the map is a street map.

* * * * *